(12) United States Patent
Yao et al.

(10) Patent No.: US 10,198,238 B2
(45) Date of Patent: Feb. 5, 2019

(54) DATA TRANSMISSION METHOD, AND RELEVANT DEVICE AND SYSTEM

(71) Applicant: TENCENT TECHNOLOGY (SHENZHEN) COMPANY LIMITED, Shenzhen (CN)

(72) Inventors: Xiaohui Yao, Shenzhen (CN); Jingui Wang, Shenzhen (CN); Feng Lu, Shenzhen (CN); Shaojie Li, Shenzhen (CN); Suipeng Qi, Shenzhen (CN); Junda Li, Shenzhen (CN); Liangliang Fan, Shenzhen (CN); Dunwei Wu, Shenzhen (CN); Yong Zhang, Shenzhen (CN); Leteng Weng, Shenzhen (CN); Qing He, Shenzhen (CN); Wei Luo, Shenzhen (CN); Ling Li, Shenzhen (CN); JingJing Li, Shenzhen (CN); Jin Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 30 days.

(21) Appl. No.: 15/633,147

(22) Filed: Jun. 26, 2017

(65) Prior Publication Data
US 2017/0293456 A1 Oct. 12, 2017

Related U.S. Application Data

(63) Continuation of application No. PCT/CN2015/098054, filed on Dec. 21, 2015.

(30) Foreign Application Priority Data

Jan. 7, 2015 (CN) .......................... 2015 1 0007932

(51) Int. Cl.
*G06F 3/147* (2006.01)
*H04L 29/08* (2006.01)
(Continued)

(52) U.S. Cl.
CPC .............. *G06F 3/147* (2013.01); *A47G 1/14* (2013.01); *G09G 3/2096* (2013.01); *G09G 5/006* (2013.01);
(Continued)

(58) Field of Classification Search
CPC ........... H04L 67/26; H04L 51/00; A47G 1/14
See application file for complete search history.

(56) References Cited

U.S. PATENT DOCUMENTS

2007/0136419 A1\* 6/2007 Taylor ................ G06F 17/3089
709/203
2014/0359453 A1 12/2014 Palfreeman
(Continued)

FOREIGN PATENT DOCUMENTS

CN 201286110 Y 8/2009
CN 101599988 A 12/2009
(Continued)

OTHER PUBLICATIONS

The World Intellectual Property Organization (WIPO) International Search Report for PCT/CN2015/098054 dated Mar. 24, 2016 pp. 1-5.
(Continued)

*Primary Examiner* — Christopher K Peterson
(74) *Attorney, Agent, or Firm* — Anova Law Group, PLLC

(57) ABSTRACT

Embodiments of the present invention disclose a data transmission method, a data transmission device and system. The method includes: receiving a picture pushing message from an instant messaging service device, the picture pushing
(Continued)

message including a target picture and a source user identification, and the picture pushing message being sent when the instant messaging service device receives a picture sending request from an instant messaging client to a specified public account, the picture sending request including the target picture and the source user identification; based on the source user identification, querying a target electronic photo frame identification having a binding relationship with the source user identification; and based on the target electronic photo frame identification, sending the target picture to an electronic photo frame corresponding to the target electronic photo frame identification.

20 Claims, 14 Drawing Sheets

(51) Int. Cl.
| | | |
|---|---|---|
| H04N 1/32 | | (2006.01) |
| A47G 1/14 | | (2006.01) |
| G09G 5/00 | | (2006.01) |
| G09G 3/20 | | (2006.01) |
| H04N 1/00 | | (2006.01) |
| H04L 12/58 | | (2006.01) |
| H04N 7/18 | | (2006.01) |

(52) U.S. Cl.
CPC .............. *H04L 51/00* (2013.01); *H04L 67/26* (2013.01); *H04N 1/00347* (2013.01); *H04N 1/32101* (2013.01); *H04N 7/188* (2013.01)

(56) References Cited

U.S. PATENT DOCUMENTS

| | | | |
|---|---|---|---|
| 2015/0199440 A1* | 7/2015 | Roeder | ................... H04L 51/16 707/692 |
| 2015/0264731 A1* | 9/2015 | Lin | ......................... H04L 67/26 455/41.2 |

FOREIGN PATENT DOCUMENTS

| | | |
|---|---|---|
| CN | 102308558 A | 1/2012 |
| CN | 103369034 A | 10/2013 |
| CN | 103561072 A | 2/2014 |
| CN | 104639424 A | 5/2015 |
| WO | 2014195672 A1 | 12/2014 |

OTHER PUBLICATIONS

The State Intellectual Property Office of the People's Republic of China (SIPO) Office Action 1 for 201510007932.3 dated Nov. 30, 2017 12 Pages (including translation).

* cited by examiner

DATA TRANSMISSION METHOD, AND RELEVANT DEVICE AND SYSTEM

CROSS-REFERENCES TO RELATED APPLICATION

This patent application is a continuation application of PCT Patent Application No. PCT/CN2015/098054, filed on Dec. 21, 2015, which claims priority to Chinese Patent Application No. 201510007932.3, entitled "DATA TRANSMISSION METHOD, AND RELEVANT DEVICE AND SYSTEM" filed on Jan. 7, 2015, the entire contents of both of which are incorporated herein by reference.

FIELD OF THE TECHNOLOGY

The present disclosure relates to the field of Internet technologies, and in particular, to a data transmission method, and a relevant device and system.

BACKGROUND OF THE DISCLOSURE

When films exit from life of ordinary people, a class process of photographing-developing films-enlarging-printing photos disappears around us. A large quantity of digital camera user groups and various types of storage media occur instead. An electronic photo frame (or referred to as a digital photo frame) is the current best path for playing back these photos. As a core product for browsing digital photos, an electronic photo frame caters for user demands.

However, it is found in practice that an existing electronic photo frame only provides local interfaces such a USB interface and a memory card interface. An electronic photo frame only plays pictures stored by a device or an apparatus, such as a USB Flash Drive or a digital camera memory card, connected to the electronic photo frame by using the foregoing local interface, and functions thereof are relatively few.

The disclosed method and system are directed to solve one or more problems set forth above and other problems.

BRIEF SUMMARY OF THE DISCLOSURE

Embodiments of the present invention disclose a data transmission method, and a relevant device and system, to enrich functions of an electronic photo frame.

A first aspect of the embodiments of the present invention discloses a data transmission method, including: receiving a picture pushing message from an instant messaging service device, the picture pushing message including a target picture and a source user identification, and the picture pushing message being sent when the instant messaging service device receives a picture sending request from an instant messaging client to a specified public account, the picture sending request including the target picture and the source user identification; based on the source user identification, querying a target electronic photo frame identification having a binding relationship with the source user identification; and based on the target electronic photo frame identification, sending the target picture to an electronic photo frame corresponding to the target electronic photo frame identification.

A second aspect of the embodiments of the present invention discloses a data transmission method, including: receiving, by an instant messaging service device, a picture sending request sent by an instant messaging client to a specified public account, the picture sending request including a target picture and a source user identification; sending, by the instant messaging service device, a picture pushing message to a photo frame background service device, the picture pushing message including the target picture and the source user identification; querying, by the photo frame background service device, a target electronic photo frame identification having a binding relationship with the source user identification by using the source user identification as a basis; and sending, by the photo frame background service device, the target picture to an electronic photo frame corresponding to the target electronic photo frame identification by using the target electronic photo frame identification as a basis.

A third aspect of the embodiments of the present invention discloses a data transmission device, including: a receiving module, configured to receive a picture pushing message sent by an instant messaging service device, the picture pushing message including a target picture and a source user identification, and the picture pushing message being sent when the instant messaging service device receives a picture sending request from an instant messaging client to a specified public account, the picture sending request comprising the target picture and the source user identification; a querying module, configured to query a target electronic photo frame identification having a binding relationship with the source user identification by using the source user identification as a basis; and a sending module, configured to send the target picture to an electronic photo frame corresponding to the target electronic photo frame identification by using the target electronic photo frame identification as a basis.

A fourth aspect of the embodiments of the present invention discloses a data transmission system, including: an instant messaging service device, and a photo frame background service device. The instant messaging service device is configured to receive a picture sending request sent by an instant messaging client to a specified public account, the picture sending request including a target picture and a source user identification; and send a picture pushing message to the photo frame background service device, the picture pushing message including the target picture and the source user identification; the photo frame background service device is configured to query a target electronic photo frame identification having a binding relationship with the source user identification by using the source user identification as a basis; and send the target picture to an electronic photo frame corresponding to the target electronic photo frame identification by using the target electronic photo frame identification as a basis.

Implementation of the embodiments of the present invention has the following beneficial effects: when a picture pushing message sent by an instant messaging service device is received, the picture pushing message includes a target picture and a source user identification; a target electronic photo frame identification corresponding to the source user identification is queried in a binding relationship between a user identification and an electronic photo frame identification by using the source user identification as a basis, and the target picture is sent to an electronic photo frame to which the target electronic photo frame identification belongs by using the target electronic photo frame identification as a basis, enriching functions of an electronic photo frame.

BRIEF DESCRIPTION OF THE DRAWINGS

To more clearly describe the technical solution in embodiments of the present invention, accompanying drawings needed to be used in description for embodiments or the prior art are briefly described below. Obviously, accompanying drawings in the following description are merely some embodiments of the present invention. A person skilled in the art can obtain other drawings according to these accompanying drawings without involving any creative effort.

DESCRIPTION OF EMBODIMENTS

The following clearly and completely describes the technical solutions in the embodiments of the present invention with reference to the accompanying drawings in the embodiments of the present invention. Apparently, the described embodiments are some of the embodiments of the present invention rather than all of the embodiments. All other embodiments obtained by a person of ordinary skill in the art based on the embodiments of the present invention without creative efforts shall fall within the protection scope of the present disclosure.

Embodiments of the present invention disclose a data transmission method, and a relevant device and system, to enrich functions of an electronic photo frame. Detailed description is provided in the following.

Figure 1:
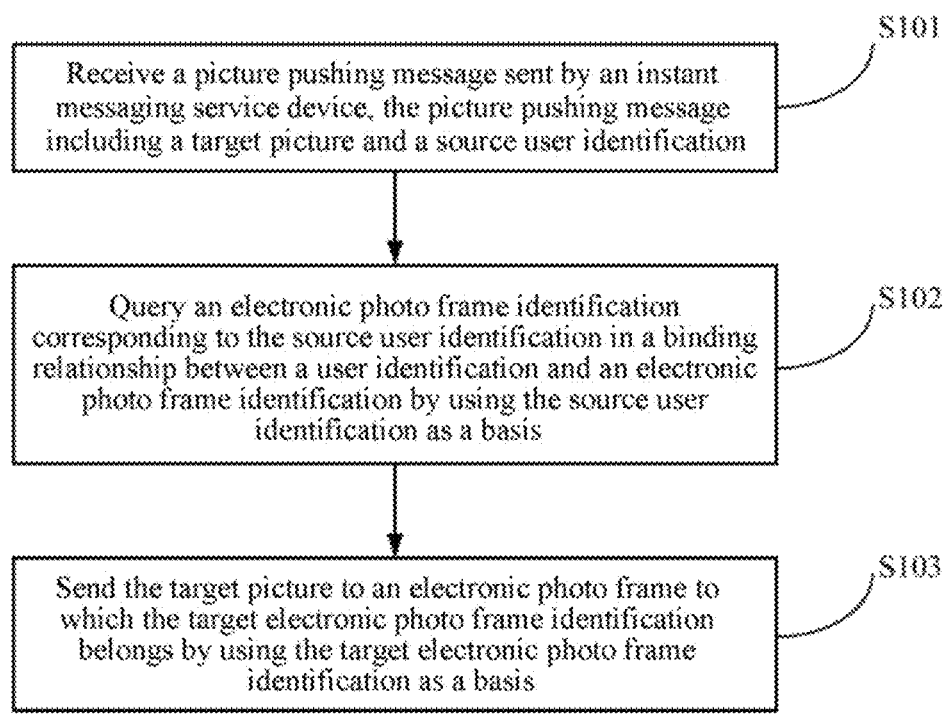
FIG. 1 is a schematic flowchart of a data transmission method according to an embodiment of the present invention.

As shown in FIG. 1, FIG. 1 is a schematic flowchart of a data transmission method according to an embodiment of the present invention. The method may be, for example, implemented by a photo frame background service device. The method may include the following steps.

S101: Receiving a picture pushing message sent by an instant messaging service device, the picture pushing message including a target picture and a source user identification. The picture pushing message is sent when the instant messaging service device receives a picture sending request sent by an instant messaging client to a specified public account. The pictures sending request may include the target picture and the source user identification. In other words, a user may login the instant messaging (IM) client with a user account, and send the target picture to the specified public account, in a same manner as sending an instant message to a specific contact in the IM client. The instant messaging service device, configured for forwarding instant messages between accounts, may receive the target picture from the IM client corresponding to the source user identification (e.g., user account), recognize that the specified public account is associated with the photo frame background service device, and send the picture pushing message to the photo frame background service device.

In this embodiment of the present invention, the foregoing method may be applied to a third party service device associated with the instant messaging service device by using the specified public account, and the third party service device may implement information interaction with the instant messaging service device by using the specified public account as an identification. For example, when receiving a message sent to the specified public account, the instant messaging service device pushes the message to the third party service device. For description, an example in which the third party service device is a photo frame background service device is used.

In this embodiment of the present invention, the instant messaging service device may include a service device to which instant messaging, such as WeChat and QQ is applied, such as a WeChat public platform service device.

In this embodiment of the present invention, a public account is an application account applied by a developer or a merchant on an instant messaging platform, and the developer or merchant may implement all-round communication and interaction with characters, pictures, audios, and videos of specific groups by the public account.

For example, using an example in which instant messaging is a WeChat application, the public account is a WeChat account (WeChat public account) applied by a developer or a merchant on a WeChat public platform, and the developer or merchant may implement and subscribe communication and interaction of other WeChat users of the WeChat public account on the WeChat platform by using the WeChat public account.

In this embodiment of the present invention, when receiving the picture sending request sent by the instant messaging client to the specified public account, the instant messaging service device may send a picture pushing message to the photo frame background service device. The picture pushing message may include a picture (that is, a target picture) included in the picture sending request and a source user identification (a user identification of a sending party).

For example, using an example in which the instant messaging service device is the WeChat public platform service device, the photo frame background service device may be associated with a specified WeChat public account. When the WeChat public platform service device receives the picture sending request sent to the specified WeChat public account by using WeChat, the picture sending request may include a picture (that is, a target picture) sent by a user request and an identification (that is, a source user identification) that is allocated by the WeChat public platform to a user specific to the specified WeChat public account. The WeChat public platform service device may send the picture pushing message including the target picture and the source user identification to the photo frame background service device according to an association relationship between the specified WeChat public account and the photo frame background service device.

S102: Querying a target electronic photo frame identification corresponding to the source user identification. For example, a database storing one or more binding relationships between one or more user identifications and one or more electronic photo frame identifications may be queried, by using the source user identification as a basis, to find the target electronic photo frame identification having the binding relationship with the source user identification.

In this embodiment of the present invention, the photo frame background service device may maintain the binding relationship between the user identification and the electronic photo frame identification. When receiving the picture pushing message sent by the instant messaging service device, the photo frame background service device may query the electronic photo frame identification (the target electronic photo frame identification) corresponding to the source user identification from the binding relationship between the user identification and the electronic photo frame identification by using the source user identification included in the picture pushing message as a basis.

S103: Sending the target picture to an electronic photo frame to which the target electronic photo frame identification belongs by using the target electronic photo frame identification as a basis.

In this embodiment of the present invention, after finding the target electronic photo frame identification corresponding to the source user identification, the photo frame background service device may send the target picture included in the picture pushing message to an electronic photo frame to which the target electronic photo frame identification belongs by using the target electronic photo frame identification as a basis.

In this embodiment of the present invention, the electronic photo frame may include a wireless communications function. For example, the electronic photo frame may include wireless communications modules, such as WIFI (Wireless-Fidelity, wireless-fidelity) communications module, a 3G (a third generation mobile communications technology) communications module, or a 4G (a fourth generation mobile communications technology) communications module. In addition, the electronic photo frame may further include a local storage space. After receiving the target picture sent by the photo frame background service device by using a wireless communications module, the electronic photo frame may store the target picture in the local storage space, for browsing and playing by a user.

In a method process described in FIG. 1, the picture pushed by using the instant messaging service device can be sent to the electronic photo frame, so that the electronic photo frame can play the picture received by using a non-local interface (such as a WIFI interface), enriching functions of the electronic photo frame.

Figure 2:
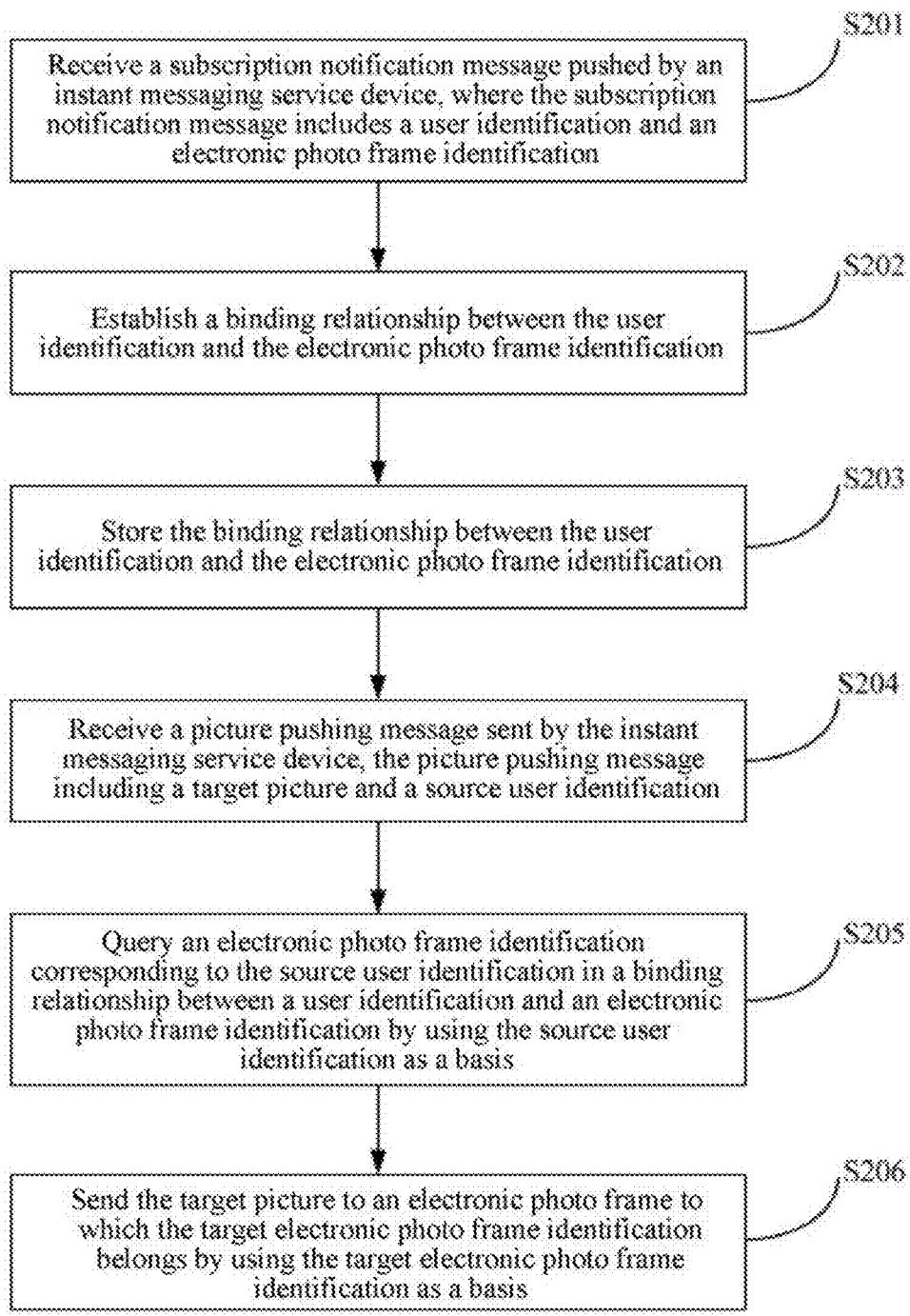
FIG. 2 is a schematic flowchart of another data transmission method according to an embodiment of the present invention.

As shown in FIG. 2, FIG. 2 is a schematic flowchart of another data transmission method according to an embodiment of the present invention. The method may include the following steps:

S201: Receiving a subscription notification message pushed by an instant messaging service device, where the subscription notification message includes a user identification and an electronic photo frame identification.

In this embodiment of the present invention, when the instant messaging service device receives a subscription request for a specified public account that is sent by an instant messaging client, the instant messaging service device may push a subscription notification message to a photo frame background service device. The subscription notification message may include a user identification and an electronic photo frame identification that are included in the subscription request.

For example, still using an example in which the instant messaging service device is a WeChat public platform service device, after logging in to WeChat on the instant messaging client, a user may scan a two-dimensional code (the two-dimensional code includes an electronic photo frame identification of an electronic photo frame) of the electronic photo frame by using a two-dimensional code scanning function of a WeChat client, to trigger WeChat to jump to a public account page of "WeChat photo frame". The user may trigger, by clicking a "follow" button in the public account page, the instant messaging client to send a following request (that is, a subscription request for a specified public account) for a WeChat public account—"WeChat photo frame" to the WeChat public platform service device. The following request may include an identification (that is, the user identification) that is allocated by the WeChat public platform to a user specific to the WeChat public account—"WeChat photo frame" and the electronic photo frame identification (which is obtained by scanning the two-dimensional code of the electronic photo frame). After receiving the following request, the WeChat public platform service device may push a following notification message (that is, the subscription notification message) including the user identification and the electronic photo frame identification to the photo frame background service device. Alternatively, the user may add the WeChat public account from a name card shared by other users, or from a search result based on the public account number or profile.

S202: Establishing a binding relationship between the user identification and the electronic photo frame identification.

S203: Storing the binding relationship between the user identification and the electronic photo frame identification.

In this embodiment of the present invention, when receiving the subscription notification message pushed by the instant messaging service device, the photo frame background service device may establish the binding relationship between the user identification and the electronic photo frame identification according to the user identification and the electronic photo frame identification that are included in the subscription notification message and locally store the binding relationship between the user identification and the electronic photo frame identification. The binding relationship between the user identification and the electronic photo frame identification that is stored by the photo frame background service device may be shown in Table 1:

TABLE 1

| User identification | Electronic photo frame identification |
|---|---|
| User identification A | Photo frame ID 1 |
| User identification B | Photo frame ID 2 |
| User identification C | Photo frame ID 3 |
| User identification D | |
| User identification E | |
| User identification F | ID 4 |
| ... | ... |

It can be known according to Table 1 that in this embodiment of the present invention, the binding relationship between the user identification and the electronic photo frame identification may be one-to-one binding or may be multiple-to-one binding. That is, one user identification may be bound to one electronic photo frame identification, or multiple user identifications may be bound to one electronic photo frame identification.

Using the example provided in the foregoing step S201 as an example, when multiple users scan a two-dimensional code of a same electronic photo frame by using a WeChat client (separately being logged in to by using different user accounts) and select to follow the WeChat public account—"WeChat photo frame", multiple user identifications may be bound to a same electronic photo frame identification.

S204: Receiving a picture pushing message sent by the instant messaging service device, the picture pushing message including a target picture and a source user identification.

In this embodiment of the present invention, when receiving the picture sending request sent by the instant messaging client to the specified public account, the instant messaging service device may send a picture pushing message to the photo frame background service device. The picture pushing message may include a picture (that is, a target picture) included in the picture sending request and a source user identification (a user identification of a sending party).

S205: Querying an electronic photo frame identification corresponding to the source user identification in a binding relationship between a user identification and an electronic photo frame identification by using the source user identification as a basis.

In this embodiment of the present invention, when receiving the picture pushing message sent by the instant messaging service device, the photo frame background service device may query the electronic photo frame identification (the target electronic photo frame identification) corresponding to the source user identification in the binding relationship (which may be as shown in Table 1) between the user identification and the electronic photo frame identification that is stored by the photo frame background service device by using the source user identification included in the picture pushing message as a basis.

For example, using an example in which it is assumed that the source user identification included in the picture pushing message is the user identification D, the photo frame background service device queries the binding relationship between the user identification and the electronic photo frame identification that is shown in Table 1 by using the user identification as a basis and can determine that the electronic photo frame identification corresponding to the user identification (the user identification D) is the photo frame ID 3.

S206: Sending the target picture to an electronic photo frame to which the target electronic photo frame identification belongs by using the target electronic photo frame identification as a basis.

In this embodiment of the present invention, after finding the target electronic photo frame identification corresponding to the source user identification, the photo frame background service device may send the target picture included in the picture pushing message to an electronic photo frame to which the target electronic photo frame identification belongs by using the target electronic photo frame identification as a basis.

For example, using the example provided in the foregoing step 205 as an example, after determining that the target electronic photo frame identification is the photo frame ID 3, the photo frame background service device may send, according to the electronic photo frame identification, the target picture to an electronic photo frame to which the photo frame ID 3 belongs.

Further, in this embodiment of the present invention, after establishing and storing the binding relationship between the user identification and the electronic photo frame identification according to the received subscription notification message, the photo frame background service device may further delete the corresponding binding relationship between the user identification and the electronic photo frame identification according to an instruction of a user at an instant messaging client side or an instruction of a user at an electronic photo frame side.

As an optional implementation manner, in this embodiment of the present invention, after the foregoing step S203, the method may further include the following steps: 11) receiving a subscription cancelling notification message sent by the instant messaging service device, the subscription cancelling notification message including a user identification; 12) querying in one or more binding relationships between one or more user identifications and one or more electronic photo frame identifications to find a binding relationship between the user identification and an electronic photo frame that corresponds to the user identification included in the subscription cancelling notification message by using the user identification included in the subscription cancelling notification message as a basis; and 13) deleting the binding relationship between the user identification and the electronic photo frame that corresponds to the user identification included in the subscription cancelling notification message.

In this implementation manner, when a user logs in to an instant messaging application by using the instant messaging client and cancels the foregoing specified public account, such as the WeChat public account—"WeChat photo frame", the instant messaging client sends a subscription cancelling request to the instant messaging service device. The subscription cancelling request includes an identification (that is, a user identification) that is allocated by the instant messaging service device to the user specific to the specified public account. After receiving the subscription cancelling request for the specified public account, the instant messaging service device pushes the subscription cancelling notification message to the photo frame background service device. The subscription cancelling notification message includes the user identification (the user identification included in the subscription cancelling request).

When receiving the subscription cancelling notification message, the photo frame background service device may query the binding relationship between the user identification and the electronic photo frame identification that corresponds to the user identification included in the subscription cancelling notification message in the binding relationship (which may be shown in Table 1) between the user identification and the electronic photo frame that is stored by the photo frame background service device.

For example, it is assumed that the user identification included in the subscription cancelling notification message is the user identification B, when receiving the subscription cancelling notification message, the photo frame background service device queries the binding relationship between the user identification and the electronic photo frame identification that is shown in Table 1 according to the user identification (that is, the user identification B) included in the subscription cancelling notification message, and determines the binding relationship between the user identification and the electronic photo frame identification that corresponds to the user identification B as "a binding relationship between the user identification B and the photo frame ID2", so that the photo frame background service device may delete the binding relationship between the user identification B and the photo frame ID 2.

As another optional implementation manner, in this embodiment of the present invention, after the foregoing step S203, the method may further include the following steps: 21) receiving a binding relationship removal request sent by an electronic photo frame, where the binding relationship removal request includes an electronic photo frame identification and a user identification; and 22) deleting the binding relationship between the electronic photo frame identification and the user identification that is included in the binding relationship removal request from the one or more binding relationships between one or more user identifications and one or more electronic photo frame identifications.

In this implementation manner, a user at an electronic photo frame side may trigger the electronic photo frame to send a binding relationship removal request to the photo frame background service device according to demands of the user, to request removal of the binding relationship between a particular user identification and the electronic photo frame identification of the electronic photo frame. The binding relationship removal request may include the electronic photo frame identification and the user identification (the user identification in the binding relationship that a user at an electronic photo frame side wants to remove; that is, a user at an electronic photo frame side wants to remove a binding relationship of a photo frame identification of the electronic photo frame and the user identification).

When receiving the binding relationship removal request sent by the electronic photo frame, the photo frame background service device may delete a relationship between the electronic photo frame identification and the user identification that is included in the binding relationship removal request from the one or more binding relationships (which may be shown in Table 1) between one or more user identifications and one or more electronic photo frame identifications stored by the photo frame background service device.

For example, using the binding relationship between the user identification and the electronic photo frame identification shown in Table 1 as an example, assuming that after knowing the user identification bound with the photo frame ID 3, a user at an electronic photo frame (which is assumed as an electronic photo frame 3) side to which the photo frame ID 3 belongs finds that the user identification D is a stranger, and the user identification often sends a bad picture to the electronic photo frame 3, the user may send the binding relationship removal request to the photo frame background service device by using the electronic photo frame 3. The binding relationship removal request includes the photo frame ID 3 (the electronic photo frame identification) and the user identification D (the user identification). When receiving the binding relationship removal request, the photo frame background service device may delete "the binding relationship between the user identification D and the photo frame ID 3" from the binding relationship between the user identification and the electronic photo frame identification that is shown in Table 1.

It should be noted that in a scenario in which the electronic photo frame sends the binding relationship removal request, to trigger the photo frame background service device to delete the corresponding binding relationship between the user identification and the electronic photo frame identification, when the instant messaging client to which the user identification in the deleted binding relationship belongs sends a picture sending request to the instant messaging service device, the instant messaging service device still can send a picture pushing message to the photo frame background service device according to the picture sending request. After the photo frame background service device receives the picture pushing message, if no corresponding binding relationship between the user identification and the electronic photo frame identification is found, the photo frame background service device may not forward a picture included in the picture pushing message. A specific implementation thereof is not described in detail herein.

In this embodiment of the present invention, that a user at an electronic photo frame side knows the user identification bound with the electronic photo frame identification of the electronic photo frame may be implemented by triggering the electronic photo frame to actively request acquisition from the photo frame background service device by a user at an electronic photo frame side, or may be implemented by actively pushing to the electronic photo frame to which the electronic photo frame identification belongs after the photo frame background service device establishes and stores the binding relationship between the user identification and the electronic photo frame identification.

As an optional implementation manner, in this embodiment of the present invention, after the foregoing step S203, the method may further include: 31) receiving a binding relationship querying request sent by an electronic photo frame, where the binding relationship querying request includes an electronic photo frame identification; 32) querying the user identification corresponding to the electronic photo frame identification included in the binding relationship querying request in the binding relationship between the user identification and the electronic photo frame identification by using the electronic photo frame identification included in the binding relationship querying request as a basis; and 33) sending the user identification corresponding to the electronic photo frame identification included in the binding relationship querying request to the electronic photo frame.

In this implementation manner, a functional button used for querying the binding relationship may be added to a specified functional interface in the electronic photo frame. A user at an electronic photo frame side may trigger, by selecting the functional button, the electronic photo frame to send the binding relationship querying request to the photo frame background service device.

For example, using an example of the binding relationship between the user identification and the electronic photo frame identification that is shown in Table 1, it is assumed that a user at an electronic photo frame (the electronic photo frame identification is the photo frame ID 3) side triggers, by clicking a "query" button in the specified functional interface of the electronic photo frame, the electronic photo frame to send the binding relationship querying request to the photo frame background service device. The binding relationship querying request includes the electronic photo frame identification (the photo frame ID 3). When receiving the binding relationship querying request, the photo frame background service device queries the binding relationship between the user identification and the electronic photo frame identification that is shown in Table 1 according to the electronic photo frame identification (the photo frame ID 3) included in the binding relationship querying request, and determines that the user identification corresponding to the photo frame ID 3 includes the user identification C, the user identification D, and the user identification E. after querying the user identification corresponding to the photo frame ID 3, the photo frame background service device may send the user identification corresponding to the photo frame ID 3 to an electronic photo frame to which the photo frame ID 3 belongs.

Further, in this embodiment of the present invention, when receiving the picture pushing message sent by the instant messaging service device, the photo frame background service device may further send a notification delivery message including the source user identification and the picture identification of the target picture to the instant messaging service device other than executing a processing process described in the foregoing steps S205 to S206, and the instant messaging service device feeds back the notification delivery message to an instant messaging client to which the source user identification belongs. The notification delivery message is used to notify that the target picture of the instant messaging client is successfully sent to the electronic photo frame. When the photo frame background service device receives the picture pushing message sent by the instant messaging service device, that the target picture is to be successfully sent to the corresponding electronic photo frame may be defaulted.

After the instant messaging client receives the notification delivery message, a user at an instant messaging client side may trigger, by clicking the notification delivery message, the instant messaging client to access a picture information description page of the target picture. A user may input a description information of the target picture in the picture information description page, and sends description information of the target picture to the photo frame background service device by using the instant messaging client. The description information may include a source user identification, and a picture identification of the target picture.

When receiving the description information of the target picture that is sent by the instant messaging client, the photo frame background service device may query the target electronic photo frame identification corresponding to the source user identification in the binding relationship between user identification and the electronic photo frame identification by using the source user identification included in the description information as a basis, and sends the description information to an electronic photo frame to which the target electronic photo frame identification belongs by using the target electronic photo frame identification as a basis.

After receiving the description information, the electronic photo frame may store the description information. When a user at an electronic photo frame side clicks to view the target picture, the electronic photo frame may display the target picture and the description information in a specified area.

For example, in this embodiment of the present invention, after completely sending the target picture by using the instant messaging client, a user at an instant messaging client side may receive the notification delivery message fed back by the instant messaging service device. The notification delivery message may be in a form of an image-text message. The user at an instant messaging client side may trigger, by clicking the notification delivery message, the instant messaging client to jump to the picture information description page. For example, the instant messaging client may access the picture information description page by using a locally mounted browser. In the picture description page, a user may input description information of the target picture. For example, assuming that the picture is a photo taken by a user during traveling, the description information may include information such as traveling time and a traveling location, and the instant messaging client sends the description information to the photo frame background service device. After receiving the description information, the photo frame background service device may query the corresponding electronic photo frame identification according to the source user identification included in the description information, and sends the description information to the electronic photo frame to which the electronic photo frame identification belongs. The electronic photo frame stores the description information. When the user at an electronic photo frame side clicks to view the target picture in the electronic photo frame, the electronic photo frame may display the target picture and the description information in a specified area.

In a method process described in FIG. 2, the binding relationship between the user identification and the electronic photo frame identification may be established and stored according to the subscription notification message of the instant messaging service device, thereby sending the picture pushed by the instant messaging service device to the electronic photo frame, so that the electronic photo frame can play a picture received by using a non-local interface (such as a WiFi interface), enriching functions of the electronic photo frame.

Figure 3:
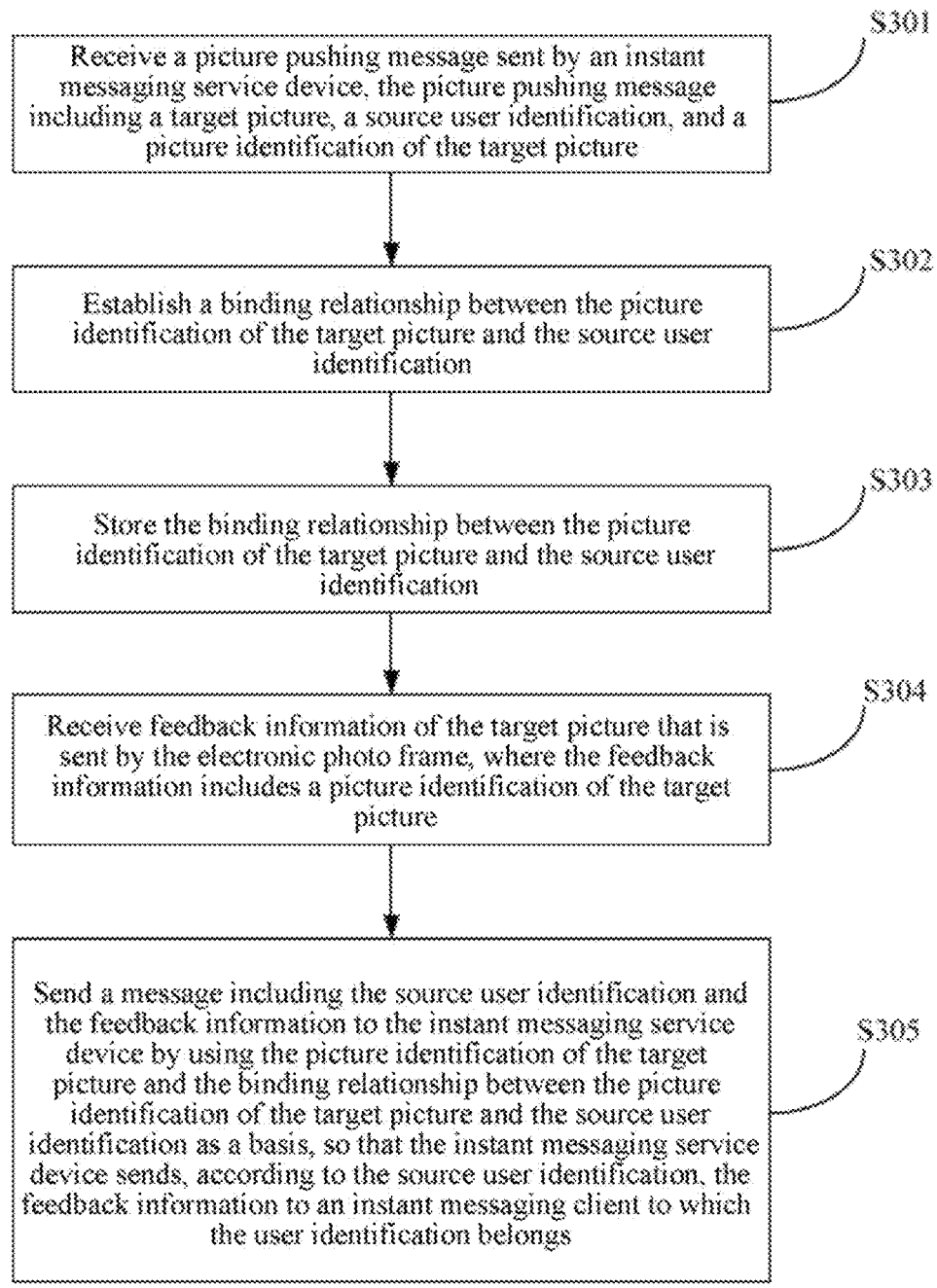
FIG. 3 is a schematic flowchart of still another data transmission method according to an embodiment of the present invention.

As shown in FIG. 3, FIG. 3 is a schematic flowchart of still another data transmission method according to an embodiment of the present invention. The method may include the following steps:

S301: Receiving a picture pushing message sent by an instant messaging service device, the picture pushing message including a target picture, a source user identification, and a picture identification of the target picture.

In this embodiment of the present invention, when receiving the picture sending request sent by the instant messaging client to the specified public account, the instant messaging service device may send a picture pushing message to the photo frame background service device. The picture pushing message may include a picture (that is, a target picture) included in the picture sending request, a source user identification (a user identification of a sending party), and a picture identification of the picture (that is, the picture identification of the target picture).

S302: Establishing a binding relationship between the picture identification of the target picture and the source user identification.

S303: Storing the binding relationship between the picture identification of the target picture and the source user identification.

In this embodiment of the present invention, when the photo frame background service device receives the picture pushing message sent by the instant messaging service device, on one hand, the target picture may be sent to an electronic photo frame to which a target electronic photo frame identification bound with a source user identification belongs. Refer to the implementation manner described in steps S102 to S103 or steps S205 to S206 for a specific implementation thereof. This is not described in detail in this embodiment of the present invention.

On the other hand, the photo frame background service device may further establish a binding relationship between the user identification and the picture identification, such as a binding relationship between the source user identification and a picture identification of the target picture, according to the user identification and the picture identification that are included in the picture pushing message, and locally stores the binding relationship between the user identification and the picture identification. The binding relationship between the user identification and the picture identification that is stored by the photo frame background service device may be as shown in Table 2:

| User identification | Picture identification |
|---|---|
| User identification A | Picture ID 1 |
| User identification B | Picture ID 2 |
|  | Picture ID 3 |
|  | Picture ID 4 |
| User identification C | Picture ID 5 |
|  | Picture ID 6 |
| ... | ... |

For example, using an example in which the instant messaging service device is a WeChat public platform service device, it is assumed after a user follows a WeChat public account—"WeChat photo frame", a WeChat public platform is that an identification of the user is the user identification A. after logging in to WeChat, the user sends a picture (which is assumed to be a picture 1) to the WeChat public account—"WeChat photo frame", and a picture identification of the picture 1 is the picture ID 1. After receiving the picture sending request, the WeChat public platform service device may send a picture pushing message to the photo frame background service device. The picture pushing message includes the picture 1 (that is, the target picture), the user identification A (that is, the source user identification), and the picture ID 1 (the picture identification of the target picture). When the photo frame background service device receives the picture pushing message, on one hand, the electronic photo frame identification bound with the user identification A may be queried, and the target picture is sent to an electronic photo frame to which the electronic photo frame identification belongs; on the other hand, a relationship between the user identification A and the picture ID 1 may be established, and a binding relationship between the user identification A and the picture ID 1 is stored.

S304: Receiving feedback information of the target picture that is sent by the electronic photo frame, where the feedback information includes a picture identification of the target picture.

In this embodiment of the present invention, the electronic photo frame can further provide a feedback function of a picture other than providing a picture browsing and playing function.

Accordingly, after the photo frame background service device sends the picture to the electronic photo frame, a user at an electronic photo frame side may also trigger, by clicking a specified functional button in the electronic photo frame other than browsing and playing the picture by using the electronic photo frame, the electronic photo frame to send feedback information of the specified picture to the photo frame background service device. The feedback information may include a picture identification of the specified picture.

For example, using an example in which an instant messaging application is WeChat, when browsing, by using the electronic photo frame, a picture sent by photo frame background service device, if a user favors a particular picture (which is assumed to be the picture 1), the user may like the picture by clicking a "like" button corresponding to the picture, to trigger the electronic photo frame to send liking information (that is, feedback information) of the picture to the photo frame background service device. The feedback information includes a picture identification (the picture ID 1) of the picture.

S305: Sending a message including the source user identification and the feedback information to the instant messaging service device by using the picture identification of the target picture and the binding relationship between the picture identification of the target picture and the source user identification as a basis, so that the instant messaging service device sends, according to the source user identification, the feedback information to an instant messaging client to which the user identification belongs.

In this embodiment of the present invention, when receiving the feedback information sent by the electronic photo frame, the photo frame background service device may query, according to the picture identification (a picture identification of the target picture) included the feedback information, a binding relationship (which may be shown in Table 2) between the user identification and the picture identification that is stored by the photo frame background service device, to determine the user identification corresponding to the picture identification, so that the photo frame background service device may send a message including the user identification, and feedback information (such as liking information) to the instant messaging service device according to the user identification.

After receiving the message that includes the user identification and the feedback information and that is sent by the photo frame background service device, the instant messaging service device may send the feedback information to an instant messaging client to which the user identification belongs according to the user identification.

For example, still using the example provided in the foregoing step S304 as an example, it is assumed that it is shown in Table 2 that the photo frame background service device stores the binding relationship between the user identification and the picture identification. When receiving the feedback information of the picture 1 that is sent by the electronic photo frame, the photo frame background service device may query, according to the picture identification, that is, the picture ID 1, included in the feedback information, the binding relationship between the user identification and the picture identification that is stored in photo frame background service device, and determines the user identification (the user identification A) corresponding to the picture identification.

The photo frame background service device may send a message including the user identification (the user identification A) and the feedback information (that is, liking information) to the WeChat public platform service device. After receiving the message, the WeChat public platform service device sends the liking information to an instant messaging client to which the user identification A belongs according to the user identification A, so that a user at an instant messaging client side may know the liking event.

In a method process described in FIG. 3, in addition that the picture pushed by the instant messaging service device is sent to the electronic photo frame, the feedback information of the target picture sent by the electronic photo frame may be fed back to the instant messaging client sending the target picture. That is, the electronic photo frame has an interaction function, further enriching functions of the electronic photo frame.

To make a person skilled in the art better understand the technical solutions provided in the embodiments of the present invention, the technical solutions provided in the embodiments of the present invention are described below with reference to specific application scenarios.

Figure 4:
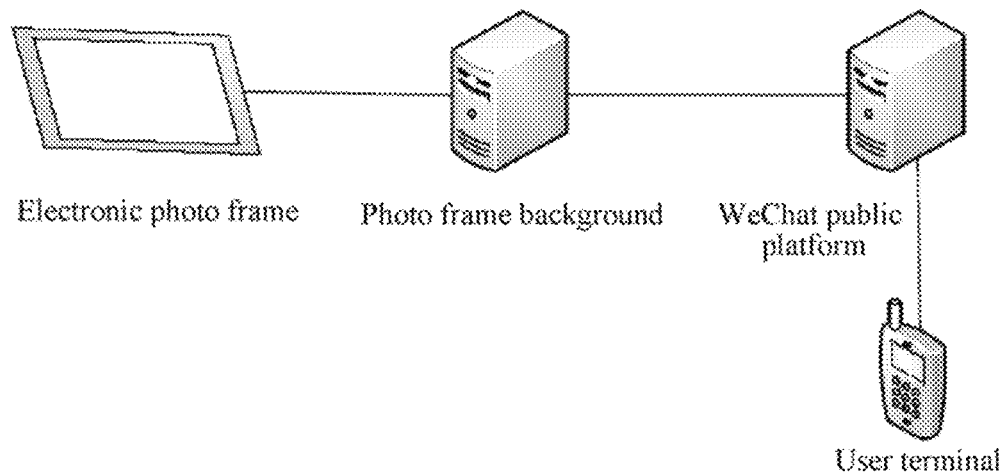
FIG. 4 is a schematic diagram of an architecture of a specific application scenario according to an embodiment of the present invention.

Referring to FIG. 4, FIG. 4 is a schematic diagram of an architecture of a specific application scenario according to an embodiment of the present invention. Using an example in which an instant messaging service device is a WeChat public platform service device (referred to as a WeChat public platform for short below), it should be noted that the instant messaging service device is not limited to a WeChat public platform and may also be a service device of another instant messaging application, such as QQ and Weibo. This is not described again subsequently in this embodiment of the present invention.

Figure 4A:
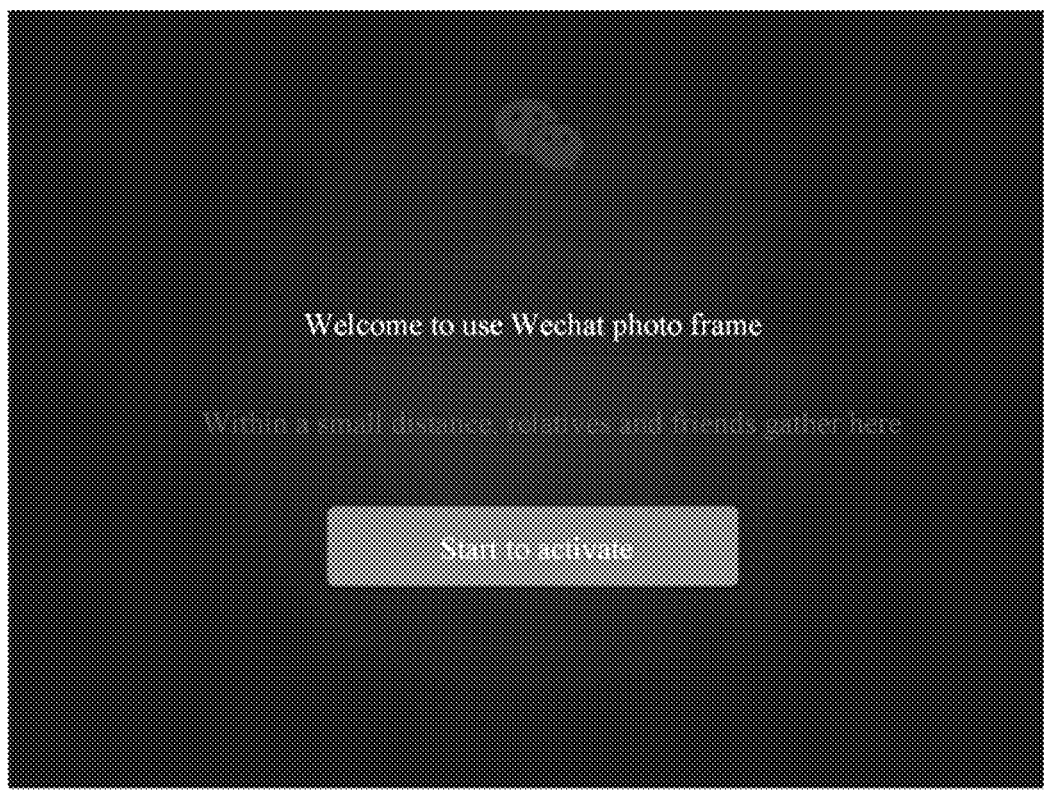
FIG. 4A to FIG. 4C is a schematic diagram of a startup guide interface of an electronic photo frame according to an embodiment of the present invention.
Figure 4B:
Figure 4C:
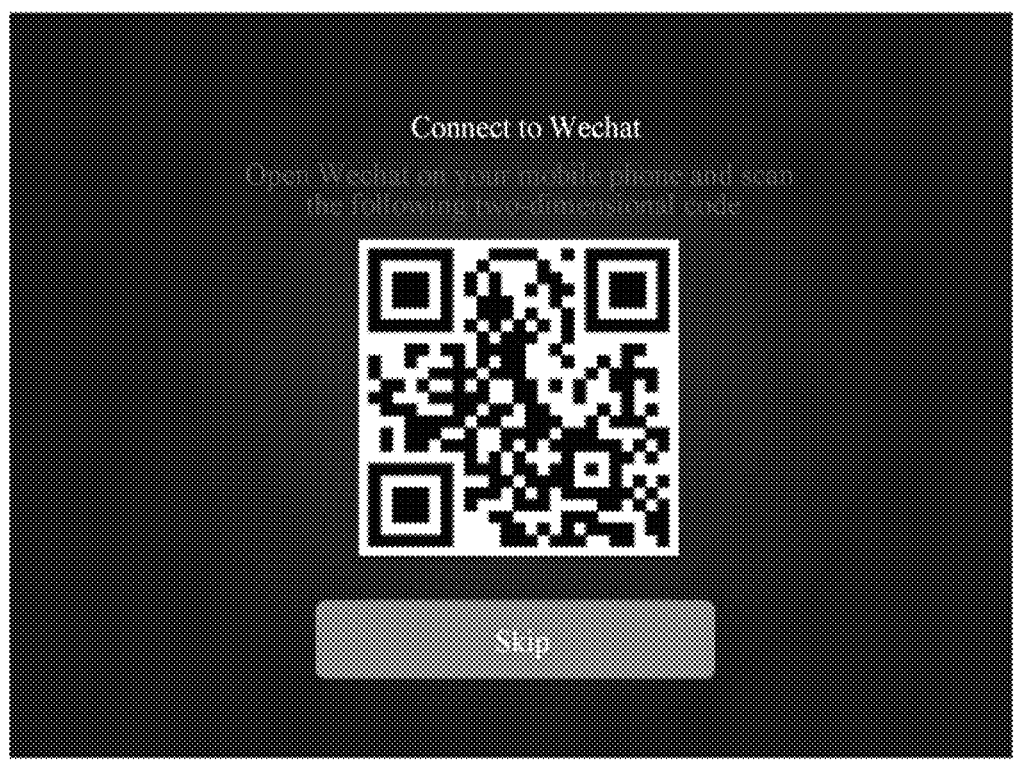

Referring to FIG. 4A to FIG. 4C, when the electronic photo frame first starts up, a user may be prompted to perform activation (as shown in FIG. 4A). After the user selects activation, such as clicking a "start to activate" button, the electronic photo frame may prompt the user to perform WiFi connection (as shown in FIG. 4B), displays a two-dimensional code (as shown in FIG. 4C, the two-dimensional code includes an electronic photo frame identification of the electronic photo frame) of the electronic photo frame in a display screen after WiFi is successfully connected, and prompts the user to scan the two-dimensional code by using WeChat to bind the WeChat photo frame.

In the application scenario, after logging in to WeChat in a user terminal, a WeChat user may scan a two-dimensional code of the electronic photo frame by using a two-dimensional code scanning function of a WeChat client, to trigger WeChat to jump to a public account page of the "WeChat photo frame". The user may trigger, by clicking a "follow" button in the public account page, the instant messaging client (which is shown in FIG. 4 as a user terminal running the instant messaging client; same below) to send a following request (that is, a subscription request for a specified public account) for the WeChat public account—"WeChat photo frame" to the WeChat public platform service device. The following request may include an identification (that is, the user identification) that is allocated by the WeChat public platform to a user specific to the WeChat public account—"WeChat photo frame" and the electronic photo frame identification (which is obtained by scanning the two-dimensional code of the electronic photo frame). After receiving the following request, the WeChat public platform service device (referred to as a photo frame background for short below) may push a following notification message (that is, the subscription notification message) including the user identification and the electronic photo frame identification to the photo frame background service device.

After receiving the following notification message, the photo frame background may establish a binding relationship between the user identification and the electronic photo frame identification according to the user identification and the electronic photo frame identification that are included in the following notification message and locally stores the binding relationship between the user identification and the electronic photo frame identification (using the binding relationship between the user identification and the electronic photo frame identification shown in Table 1 as an example).

Figure 4D:
FIG. 4D is a schematic diagram of a display interface when an electronic photo frame receives a prompt message according to an embodiment of the present invention.
Figure 4E:
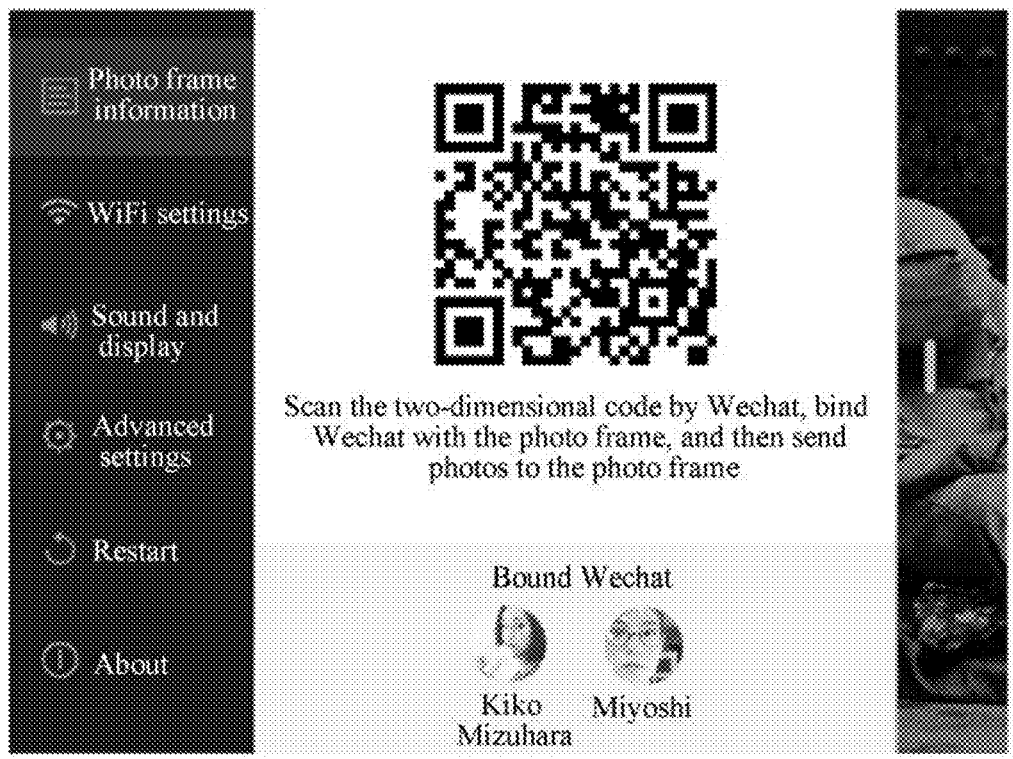
FIG. 4E is a schematic diagram of a setting interface of an electronic photo frame according to an embodiment of the present invention.

After establishing and storing the binding relationship between the user identification and the electronic photo frame identification, the photo frame background may deliver a prompt message to the electronic photo frame, to prompt a user at an electronic photo frame side the binding event. The prompt message may be "someone binds the electronic photo frame", and a schematic diagram thereof may be shown in FIG. 4D. After seeing the prompt message, the user may click the prompt message to enter a setting interface shown in FIG. 4E, to check a user that binds the electronic photo frame. In addition, in the setting interface, the user may further set WiFi to which the electronic photo frame is connected and parameters such as a sound and display of the electronic photo frame, and a specific implementation thereof is not described in detail herein.

In the application scenario, the instant messaging client may also send a subscription cancelling request for the specified public account (such as the WeChat public account—"WeChat photo frame") to the WeChat public platform, to trigger the photo frame background to delete the corresponding binding relationship between the user identification and the electronic photo frame identification. The electronic photo frame may send a binding relationship querying request to the photo frame background, to query a user identification bound with the electronic photo frame identification of the electronic photo frame, or may send a binding relationship removal request to the photo frame background, to remove the corresponding binding relationship between the user identification and the electronic photo frame identification of the electronic photo frame. Refer to relevant implementations described in FIG. 2 for specific implementations thereof. This is not described in detail in this embodiment of the present invention.

Figure 5:
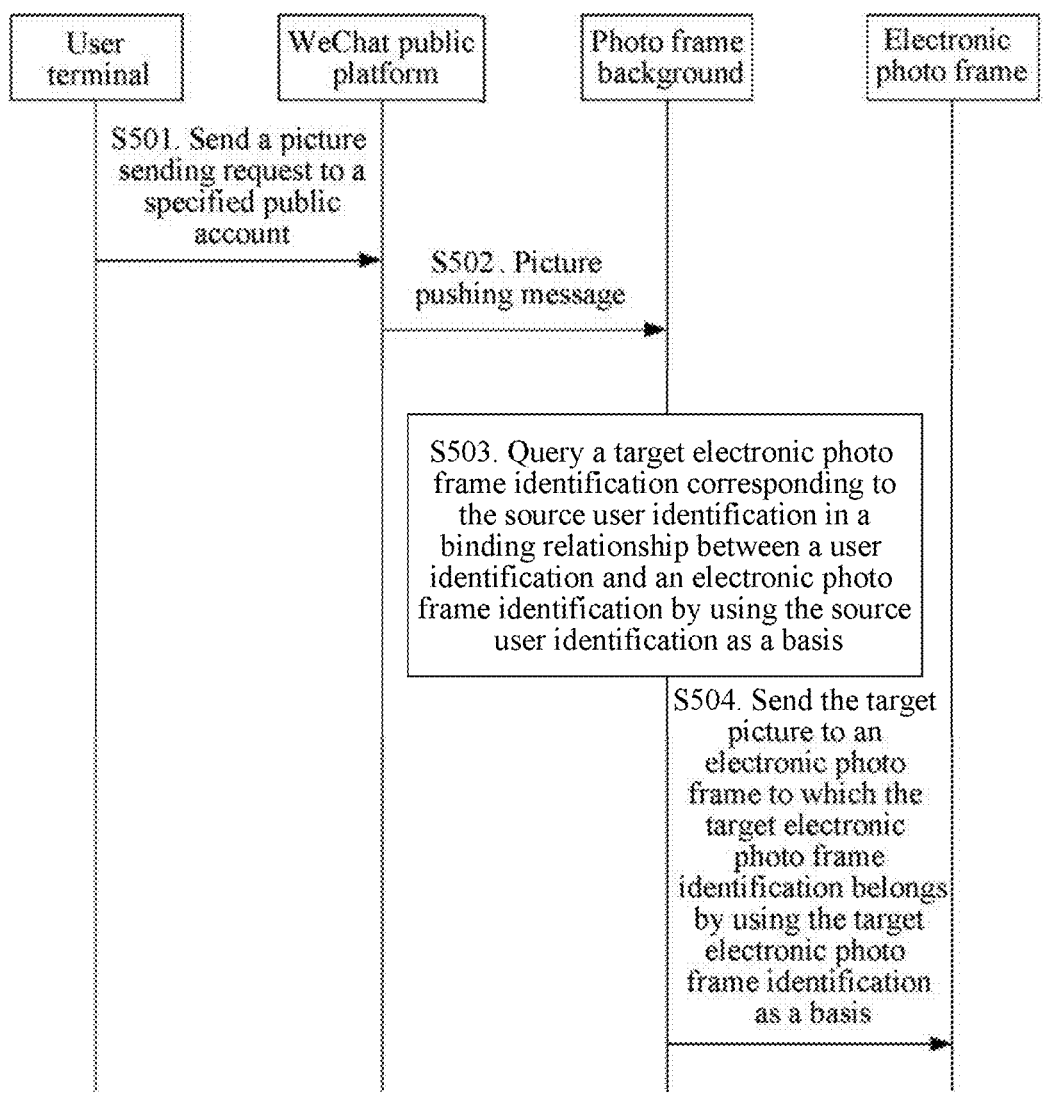
FIG. 5 is a schematic flowchart of a data transmission method based on the application scenario shown in FIG. 4 according to an embodiment of the present invention.

Based on the application scenario, an embodiment of the present invention provides a data transmission method. As shown in FIG. 5, FIG. 5 is a schematic flowchart of a data transmission method according to an embodiment of the present invention. The method may include the following steps:

S501: A WeChat public platform sends a picture sending request sent by an instant messaging client to a specified public account, the picture sending request including a target picture and the source user identification.

In this embodiment, the specified public account is a WeChat public account—"WeChat photo frame". It is assumed that a target picture included in a picture sending request is a picture 1, and a source user identification is a user identification A.

S502: The WeChat public platform sends a picture pushing message to a photo frame background, where the picture pushing message includes the target picture and the source user identification.

S503: The photo frame background queries a target electronic photo frame identification corresponding to the source user identification in a binding relationship between a user identification and an electronic photo frame identification by using the source user identification as a basis.

In this embodiment, when receiving the picture pushing message sent by the WeChat public platform, the photo frame background may query, according to the source user identification included in the picture pushing message, the binding relationship between the user identification and the electronic photo frame identification that is stored by the photo frame background, to determine a target electronic photo frame identification corresponding to the source user identification.

When the source user identification is the user identification A, when the binding relationship between the user identification and the electronic photo frame identification is shown in Table 1, the photo frame background queries and determines that the target electronic photo frame identification corresponding to the source user identification is a photo frame ID 1.

S504: The photo frame background sends the target picture to an electronic photo frame to which the target electronic photo frame identification belongs by using the target electronic photo frame identification as a basis.

In this embodiment, when querying and determining that the target electronic photo frame identification corresponding to the source user identification is the photo frame ID 1, the photo frame background may send the target picture (that is, the picture 1) included in the picture pushing message to an electronic photo frame to which the photo frame ID 1 belongs.

Further, in the application scenario, when receiving the picture pushing message sent by the WeChat public platform, the photo frame background may also send a notification delivery message including the source user identification and a picture identification of the target picture to the WeChat public platform, and the WeChat public platform feeds back the notification delivery message to an instant messaging client to which the source user identification belongs. The notification delivery message is used to notify that the target picture of the instant messaging client is successfully sent to the electronic photo frame. When the photo frame background receives the picture pushing message sent by the WeChat public platform, that the target picture is to be successfully sent to the corresponding electronic photo frame may be defaulted.

After the instant messaging client receives the notification delivery message, a user at an instant messaging client side may trigger, by clicking the notification delivery message, the instant messaging client to access a picture information description page of the target picture. A user may input a description information of the target picture in the picture information description page, and sends description information of the target picture to the photo frame background service device by using the instant messaging client. The description information may include a source user identification, and a picture identification of the target picture.

When receiving the description information of the target picture that is sent by the instant messaging client, the instant messaging client may query the target electronic photo frame identification corresponding to the source user identification in the binding relationship between user identification and the electronic photo frame identification by using the source user identification included in the description information as a basis, and sends the description information to an electronic photo frame to which the target electronic photo frame identification belongs by using the target electronic photo frame identification as a basis.

Figure 4F:
FIG. 4F is a schematic diagram of display of a picture including description information according to an embodiment of the present invention.

After receiving the description information, the electronic photo frame may store the description information. When a user at an electronic photo frame side clicks to view the target picture, the electronic photo frame may display the target picture and the description information in a specified area. A schematic diagram thereof may be shown in FIG. 4F.

Further, in the application scenario, the picture sending request received by the WeChat public platform may also include the picture identification of the target picture other than including the target picture and the source user identification. Accordingly, the picture pushing message sent by the WeChat public platform to the photo frame background may also include the picture identification of the target picture.

When the photo frame background receives the picture pushing message sent by the WeChat public platform, on one hand, referring to manners of the foregoing steps S503 to S504, the target picture may be sent to an electronic photo frame to which the electronic photo frame identification bound with the source user identification belongs; on the other hand, a binding relationship, such as a binding relationship between the picture identification of the target picture and the source user identification, between the picture identification and the user identification that is included in the picture pushing message may be established and stored. The binding relationship between the picture identification and the user identification that is stored by the photo frame background may be shown in Table 2.

Figure 6:
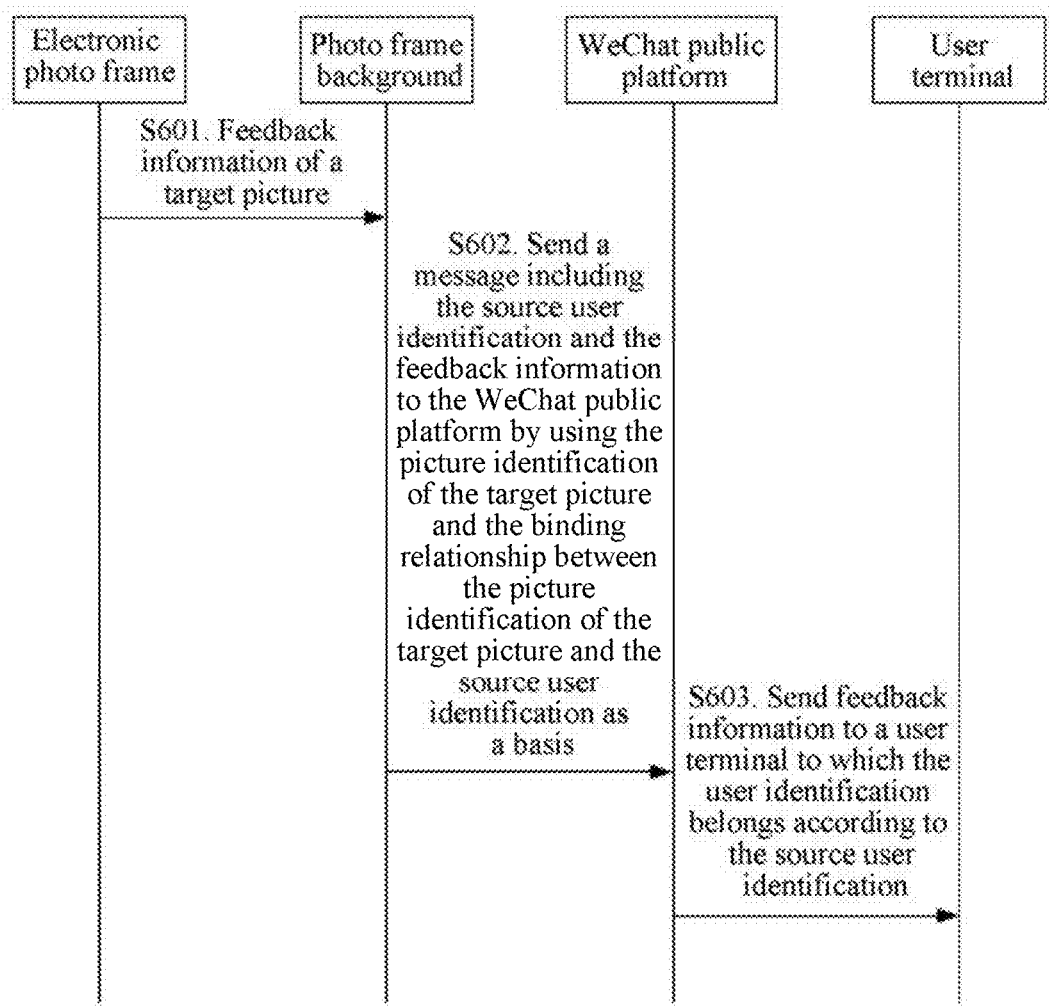
FIG. 6 is a schematic flowchart of another data transmission method based on the application scenario shown in FIG. 4 according to an embodiment of the present invention.

Based on the application scenario, an embodiment of the present invention provides another data transmission method. As shown in FIG. 6, FIG. 6 is a schematic flowchart of another data transmission method according to an embodiment of the present invention. The method may include the following steps:

S601: A photo frame background receives feedback information of a target picture that is sent by the electronic photo frame, where the feedback information includes a picture identification of the target picture.

In this embodiment, after the electronic photo frame receives a picture sent by the photo frame background, a user at an electronic photo frame side may browse and play the received picture by using the electronic photo frame. If a user at an electronic photo frame side favors a particular picture (such as a picture 1), the user may click a "like" button corresponding to the picture, to like the picture, to trigger the electronic photo frame to send liking information of the picture 1 to the photo frame background. The liking information may include a picture identification of the picture 1. It is assumed that the picture identification is a picture ID 1.

S602: The photo frame background sends a message including the source user identification and the feedback information to the WeChat public platform by using the picture identification of the target picture and the binding relationship between the picture identification of the target picture and the source user identification as a basis.

In this embodiment, when receiving the liking information sent by the electronic photo frame, the photo frame background may query, according to the picture identification (that is, the picture ID 1) included in the liking information, the binding relationship (as shown in FIG. 2) between the picture identification and the user identification that is stored by the photo frame background and determine that the user identification corresponding to the picture ID 1 is the user identification A.

The photo frame background may send a message including the user identification A and the liking information to the WeChat public platform.

S603: The WeChat public platform sends feedback information to an instant messaging client to which the user identification belongs according to the source user identification.

In this embodiment, when receiving the message that includes the user identification A and the liking information and that is sent by the photo frame background, the WeChat public platform may send the liking information to the instant messaging client to which the user identification A belongs according to the user identification A, so that a user at an instant messaging client side may know that the picture sent by the user to the electronic photo frame is liked.

It can be known from the foregoing description that in the technical solutions provided in the embodiments of the present invention, when receiving a picture pushing message sent by an instant messaging service device, on one hand, according to a source user identification included in the picture pushing message, a target picture included in the picture pushing message may be sent to an electronic photo frame to which an electronic photo frame identification bound with the source user identification belongs, so that the electronic photo frame can play a picture received by using a non-local interface, enriching functions of the electronic photo frame. On the other hand, a binding relationship between a picture identification of the target picture and the source user identification that is included in the picture pushing message may be established, so as to feed back, by using the instant messaging service device, feedback information to an instant messaging client to which the source user identification belongs when the feedback information of the target picture that is sent by the electronic photo frame is received, so that the electronic photo frame further has an interaction function, further enriching functions of the electronic photo frame.

Based on a technical concept same as that of the foregoing method embodiment, an embodiment of the present invention further provides a data transmission device, which can be applied to the foregoing method embodiment.

Figure 7:
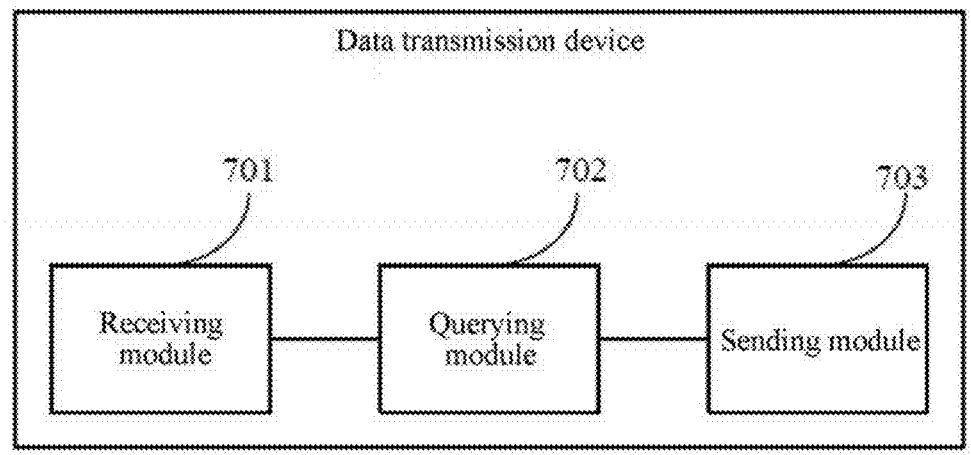
FIG. 7 is a schematic structural diagram of a data transmission device according to an embodiment of the present invention.

As shown in FIG. 7, FIG. 7 is a schematic flowchart of a data transmission device according to an embodiment of the present invention. The device may include: at least a processor and one or more modules stored on a memory and executable by the processor, the one or more modules comprises:

a receiving module 701, configured to receive a picture pushing message sent by an instant messaging service device, the picture pushing message including a target picture and a source user identification, and the picture pushing message being sent when the instant messaging service device receives a picture sending request including the target picture and the source user identification and sent by an instant messaging client to a specified public account; a querying module 702, configured to query a target electronic photo frame identification corresponding to the source user identification in a binding relationship between a user identification and an electronic photo frame identification by using the source user identification as a basis; and a sending module 703, configured to send the target picture to an electronic photo frame to which the target electronic photo frame identification belongs by using the target electronic photo frame identification as a basis.

In an optional embodiment, the sending module 703 may be further configured to send a notification delivery message to the instant messaging service device, where the notification delivery message includes a picture identification of the target picture and the source user identification.

Accordingly, the receiving module 701 may be further configured to receive description information of the target picture sent by an instant messaging client to which the source user identification belongs, where the description information includes the picture identification of the target picture and the source user identification.

The querying module 702 may be further configured to query a target electronic photo frame identification corresponding to the source user identification in a binding relationship between a user identification and an electronic photo frame identification by using the source user identification as a basis.

The sending module 703 may be further configured to send the description information to an electronic photo frame to which the target electronic photo frame identification belongs by using the target electronic photo frame identification as a basis, so that the electronic photo frame to which the target electronic photo frame identification belongs stores the description information, and displays the target picture and the description information in a specified area when a checking request for the target picture is received.

In an optional embodiment, the receiving module 701 may be further configured to receive a subscription notification message pushed by the instant messaging service device, where the subscription notification message includes a user identification and an electronic photo frame identification.

Figure 8:
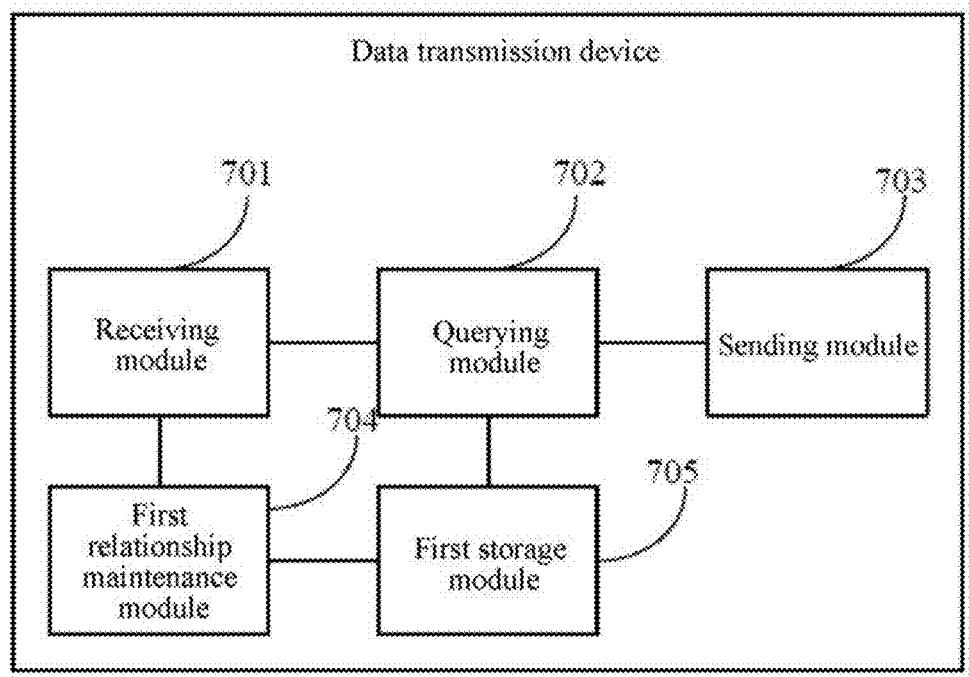
FIG. 8 is a schematic structural diagram of another data transmission device according to an embodiment of the present invention.

Accordingly, referring to FIG. 8, FIG. 8 is a schematic structural diagram of another data transmission device disclosed in an embodiment of the present invention. The data transmission device shown in FIG. 8 is obtained by optimizing the data transmission device shown in FIG. 7. Compared with the data transmission device shown in FIG. 7, the data transmission device shown in FIG. 8 may further include: a first relationship maintenance module 704, configured to establish a binding relationship between the user identification and the electronic photo frame identification; and a first storage module 705, configured to store the binding relationship between the user identification and the electronic photo frame identification.

In an optional embodiment, the receiving module 701 may be further configured to receive a subscription cancelling notification message pushed by the instant messaging service device, where the subscription cancelling notification message includes a user identification.

Accordingly, the querying module 702 may be further configured to query in the binding relationship between the user identification and the electronic photo frame identification a binding relationship between the user identification and an electronic photo frame identification that corresponds to the user identification included in the subscription cancelling notification message by using the user identification included in the subscription cancelling notification message as a basis.

The first relationship maintenance module 704 may be further configured to delete the binding relationship between the user identification and the electronic photo frame identification that corresponds to the user identification in the subscription cancelling notification message.

In an optional embodiment, the receiving module 701 may be further configured to receive a binding relationship querying request sent by the electronic photo frame, where the binding relationship querying request includes an electronic photo frame identification.

Accordingly, the query module 702 may be configured to query the user identification corresponding to the electronic photo frame identification included in the binding relationship querying request in the binding relationship between the user identification and the electronic photo frame identification by using the electronic photo frame identification included in the binding relationship querying request as a basis.

The sending module 703 may be further configured to send a user identification corresponding to the electronic photo frame identification included in the binding relationship querying request to the electronic photo frame.

In an optional embodiment, the receiving module 701 may be further configured to receive a binding relationship removal request sent by the electronic photo frame, where the binding relationship removal request includes an electronic photo frame identification and a user identification.

Accordingly, the first relationship maintenance module 704 may be further configured to delete the binding relationship between the electronic photo frame identification and the user identification that is included in the binding relationship removal request from the binding relationship between the user identification and the electronic photo frame identification.

In an optional embodiment, the picture pushing message further includes a picture identification of the target picture.

Figure 9:
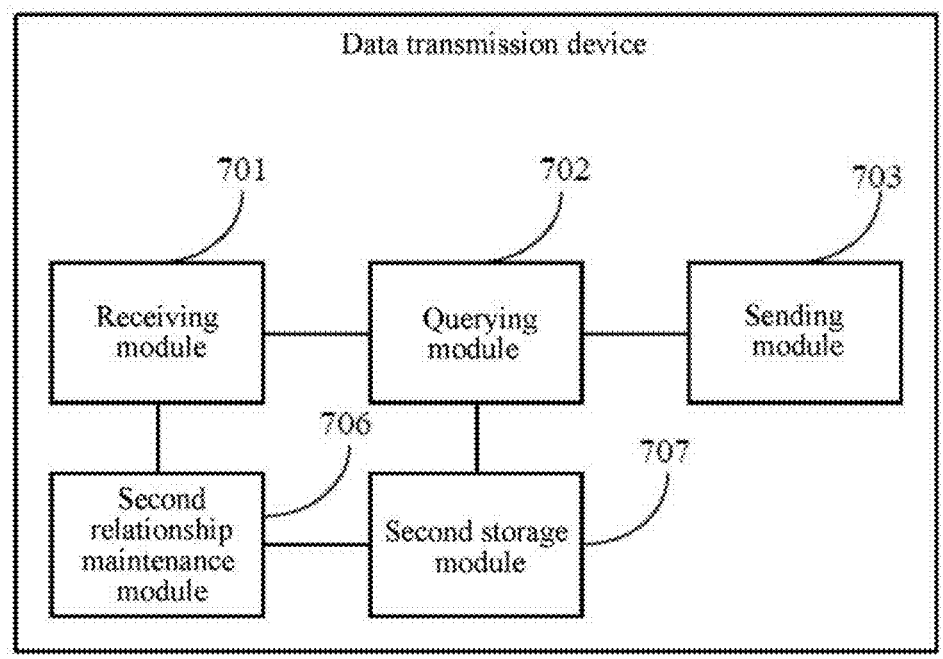
FIG. 9 is a schematic structural diagram of still another data transmission device according to an embodiment of the present invention.

Accordingly, referring to FIG. 9, FIG. 9 is a schematic structural diagram of still another data transmission device disclosed in an embodiment of the present invention. The data transmission device shown in FIG. 9 is obtained by optimizing the data transmission device shown in FIG. 7. Compared with the data transmission device shown in FIG. 7, the data transmission device shown in FIG. 9 may further include: a second relationship maintenance module 706, configured to establish a binding relationship between the picture identification of the target picture and the source user identification; and a second storage module 707, configured to store the binding relationship between the picture identification of the target picture and the source user identification.

Accordingly, the receiving module 701 may be further configured to receive feedback information of the target picture that is sent by the electronic photo frame, where the feedback information includes a picture identification of the target picture.

The sending module 703 may be further configured to send a message including the source user identification and the feedback information to the instant messaging service device by using the picture identification of the target picture and the binding relationship between the picture identification of the target picture and the source user identification as a basis, so that the instant messaging service device sends, according to the source user identification, the feedback information to an instant messaging client to which the user identification belongs.

According to an embodiment of the present invention, the data transmission method shown in FIG. 1 to FIG. 3 may be an image synthesis method executed by units in the data transmission device shown in FIG. 7 to FIG. 9. For example, the steps S101, S102, and S103 shown in FIG. 1 may respectively executed by the receiving module 701, the querying module 702, and the sending module 703 shown in FIG. 7. The steps S201, S202, S203, S204, S205, and S206 shown in FIG. 2 may be respectively executed by the receiving module 701, the first relationship maintenance module 704, the first storage module 705, the receiving module 701, the querying module 702, and the sending module 703 shown in FIG. 8. The steps S301, S302, S303, S304, and S305 shown in FIG. 3 may be respectively executed by the receiving module 701, the second relationship maintenance module 706, the second storage module 707, the receiving module 701, and the sending module 703 shown in FIG. 9.

According to another embodiment of the present invention, units in the data transmission device shown in FIG. 7 to FIG. 9 may be composed by being separately or all merged into one or several other units, or may by composed by diving some unit(s) into multiple functionally smaller units. In this way, a same operation can be implemented, and implementation of technical effects of this embodiment of the present invention is not influenced.

According to still another embodiment of the present invention, the data transmission device shown in FIG. 7 to FIG. 9 is constructed and the data transmission method according to the embodiments of the present invention is implemented by operating a computer program (including program code) capable of executing the data transmission method shown in FIG. 1 to FIG. 3 on a general computing device including a processing element and a storage element such as a central processing unit (CPU), a random access memory (RAM), and a read-only memory (ROM). The computer program can be recorded on, for example, a computer readable recording medium, is loaded on the foregoing computing device by using the computer readable recording medium, and operates therein.

Based on a technical concept same as that of the foregoing method embodiment, an embodiment of the present invention further provides a data transmission system, which can be applied to the foregoing method embodiment.

Figure 10:
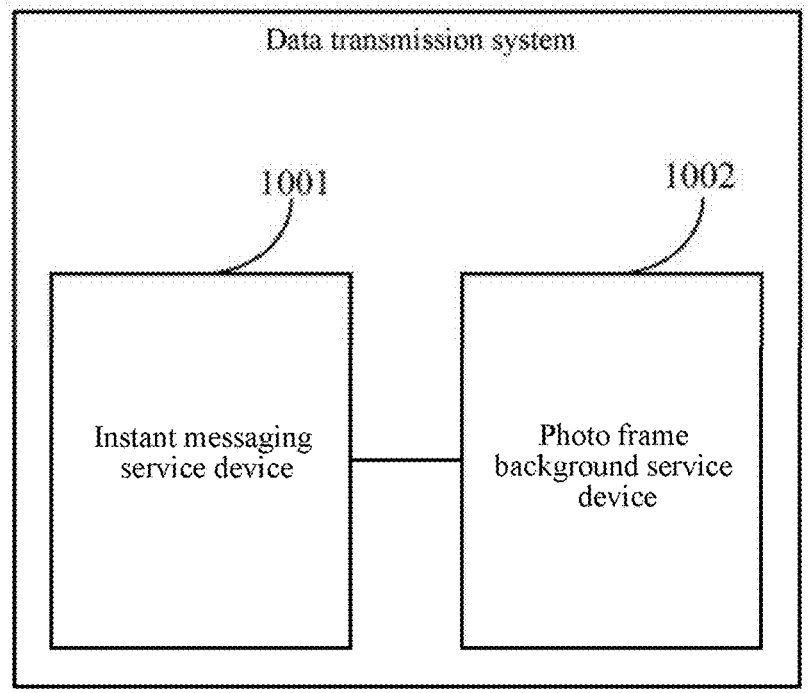
FIG. 10 is a schematic diagram of an architecture of a data transmission system according to an embodiment of the present invention.

As shown in FIG. 10, FIG. 10 is a schematic diagram of an architecture of a data transmission system according to an embodiment of the present invention. The system may include: an instant messaging service device 1001, configured to receive a picture sending request sent by an instant messaging client to a specified public account, the picture sending request including a target picture and a source user identification; the instant messaging service device 1001, further configured to send a picture pushing message to a photo frame background service device, the picture pushing message including the target picture and the source user identification; the photo frame background service device 1002, configured to query a target electronic photo frame identification corresponding to the source user identification in a binding relationship between a user identification and an electronic photo frame identification by using the source user identification as a basis; and the photo frame background service device 1002, further configured to send the target picture to an electronic photo frame to which the target electronic photo frame identification belongs by using the target electronic photo frame identification as a basis.

In an optional embodiment, the instant messaging service device 1001 may be further configured to receive a subscription request for the specified public account that is sent by the instant messaging client, where the subscription request includes a user identification and an electronic photo frame identification; the instant messaging service device 1001 may be further configured to send a subscription notification message to the photo frame background service device, where the subscription notification message includes the user identification and the electronic photo frame identification; the photo frame background service device 1002 may be further configured to establish a binding relationship between the user identification and the electronic photo frame identification; and the photo frame background service device 1002 may be further configured to store the binding relationship between the user identification and the electronic photo frame identification.

In an optional embodiment, the instant messaging service device 1001 may be further configured to receive a subscription cancelling request for the specified public account that is sent by the instant messaging client, where the subscription cancelling request includes a user identification; the instant messaging service device 1001 may be further configured to send a subscription cancelling notification message to the photo frame background service device, where the subscription cancelling notification message includes the user identification; the photo frame background service device 1002 may be further configured to query in the binding relationship between the user identification and the electronic photo frame identification a binding relationship between the user identification and an electronic photo frame identification that corresponds to the user identification included in the subscription cancelling notification message by using the user identification included in the subscription cancelling notification message as a basis; and the photo frame background service device 1002 may be further configured to delete the binding relationship between the user identification and the electronic photo frame identification that corresponds to the user identification in the subscription cancelling notification message.

In an optional embodiment, the photo frame background service device 1002 may be further configured to receive a binding relationship querying request sent by the electronic photo frame, where the binding relationship querying request includes an electronic photo frame identification; the photo frame background service device 1002 may be configured to query the user identification corresponding to the electronic photo frame identification included in the binding relationship querying request in the binding relationship between the user identification and the electronic photo frame identification by using the electronic photo frame identification included in the binding relationship querying request as a basis; and the photo frame background service device 1002 may be further configured to send a user identification corresponding to the electronic photo frame identification included in the binding relationship querying request to the electronic photo frame.

In an optional embodiment, the photo frame background service device 1002 may be further configured to receive a binding relationship removal request sent by the electronic photo frame, where the binding relationship removal request includes an electronic photo frame identification and a user identification; and the photo frame background service device 1002 may be further configured to delete the binding relationship between the electronic photo frame identification and the user identification that is included in the binding relationship removal request from the binding relationship between the user identification and the electronic photo frame identification.

In an optional embodiment, the picture pushing message further includes a picture identification of the target picture; the photo frame background service device 1002 may be further configured to establish a binding relationship between the picture identification of the target picture and the source user identification; the photo frame background service device 1002 may be further configured to store the binding relationship between the picture identification of the target picture and the source user identification; the photo frame background service device 1002 may be further configured to receive feedback information of the target picture that is sent by the electronic photo frame, where the feedback information includes a picture identification of the target picture; the photo frame background service device 1002 may be further configured to send a message including the source user identification and the feedback information to the instant messaging service device by using the picture identification of the target picture and the binding relationship between the picture identification of the target picture and the source user identification; and the photo frame background service device 1002 may be further configured to send, according to the source user identification, the feedback information to an instant messaging client to which the user identification belongs.

In an optional embodiment, the photo frame background service device 1002 may be further configured to send a notification delivery message to the instant messaging service device, where the notification delivery message includes a picture identification of the target picture and the source user identification; the instant messaging service device 1001 may be configured to send the notification delivery message to an instant messaging client to which the source user identification belongs; the photo frame background service device 1002 may be configured to receive description information of the target picture sent by an instant messaging client to which the source user identification belongs, where the description information includes the picture identification of the target picture and the source user identification; the photo frame background service device 1002 may be further configured to query a target electronic photo frame identification corresponding to the source user identification in a binding relationship between a user identification and an electronic photo frame identification by using the source user identification as a basis; and the photo frame background service device 1002 may be further configured to send the description information to an electronic photo frame to which the target electronic photo frame identification belongs by using the target electronic photo frame identification as a basis, so that the electronic photo frame to which the target electronic photo frame identification belongs stores the description information, and displays the target picture and the description information in a specified area when a checking request for the target picture is received.

The foregoing photo frame background service device 1002 may include any data transmission device shown in FIG. 7 to FIG. 9.

Figure 11:
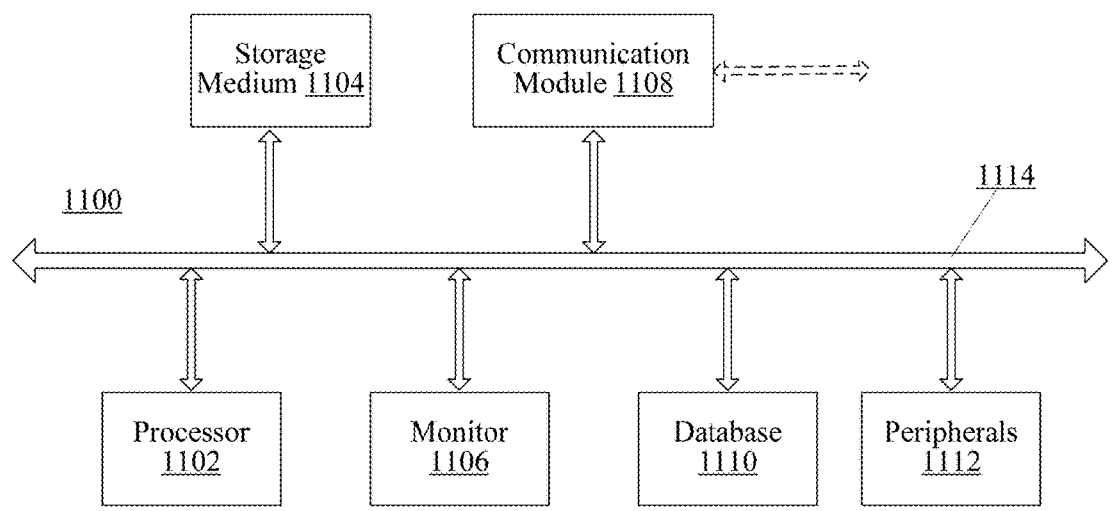
FIG. 11 is a block diagram of an exemplary computer system consistent with the disclosed embodiments.

The electronic photo frame, the photo frame background service device, the instant messaging service device, and/or the user terminal may be implemented on any appropriate computing platform. FIG. 11 shows a block diagram of an exemplary computing system 1100 capable of implementing the disclosed devices/terminals. As shown in FIG. 11, the exemplary computer system 1100 may include a processor 1102, a storage medium 1104, a monitor 1106, a communication module 1108, a database 1110, peripherals 1112, and one or more bus 1114 to couple the devices together. Certain devices may be omitted and other devices may be included.

The processor 1102 can include any appropriate processor or processors. Further, the processor 1102 can include multiple cores for multi-thread or parallel processing. The storage medium 1104 may include memory modules, e.g., Read-Only Memory (ROM), Random Access Memory (RAM), and flash memory modules, and mass storages, e.g., CD-ROM, U-disk, removable hard disk, etc. The storage medium 1104 may store computer programs for implementing various processes (e.g., running instant messaging application, transmitting and displaying photos, maintaining instant messaging services, etc.), when executed by the processor 1102.

The monitor 1106 may include display devices for displaying contents in the computing system 1100, e.g., displaying a user interface of an IM client or displaying digital photos. The peripherals 1112 may include I/O devices, e.g., keyboard and mouse for inputting information by a user. The peripherals may also include certain sensors, such as gravity sensors, acceleration sensors, and other types of sensors.

Further, the communication module 1108 may include network devices for establishing connections through a communication network. The communication network may include any appropriate type of communication network for providing network connections, either wired or wireless. The database 1110 may include one or more databases for storing certain data and for performing certain operations on the stored data, e.g., storing binding relationships and responding to related queries.

In description of the present specification, description of reference terms such as "one embodiment", "some embodiments", "example", "specific example" or "some examples" means including specific features, structures, materials, or features described in the embodiment or example in at least one embodiment or example of the present disclosure. In the present specification, schematic expressions for the foregoing terms are not necessarily specific to the same embodiment or example. In addition, the described specific features, structures, materials, or features can be combined in a proper manner in any one or more embodiments or examples. In addition, in the case of no mutual contradiction, a person skilled in the art can join and combine different embodiments or examples described in the present specification and features of different embodiments or examples.

In addition, terms "first" and "second" are only used to describe the objective and cannot be understood as indicating or implying relative importance or implying a quantity of the indicated technical features. Therefore, features defining "first" and "second" can explicitly or implicitly include at least one of the features. In description of the present disclosure, "multiple" means at least two, such as two and three unless it is specifically defined otherwise.

Any process or method description described in a flowchart or in another manner can be understood as a module, segment, or part representing codes including one or more executable instructions for implementing specific logical functions or steps of a process. In addition, a range of preferred implementation manners of the present disclosure include another implementation, and functions can be executed not according to the shown or discussed sequence, including according to a basically simultaneous manner according to involved functions or an opposite sequence, which should be understood by a person skilled in the art of the embodiments of the present invention.

Logics and/or steps represented in a flowchart or described in another manner can be regarded as, for example, a sequencing list of executable instructions for implementing logical functions, and can be specifically implemented in any computer readable medium, for an instruction execution system, apparatus, or device (such as a computer-based system, a system including a processor, or another system that can take and execute instructions from an instruction execution system, apparatus, or device) to use or use by combining these instruction execution systems, apparatuses, or devices. In the present specification, "a computer readable medium" may be any apparatus that may include, store, communicate with, propagate, or transmit programs for an instruction execution system, apparatus, or device to use or use by combining these instruction execution systems, apparatuses, or devices. A specific example (a non-greedy list) of the computer readable medium includes the following: an electric connection portion (an electronic apparatus) including one or more wirings, a portable computer enclosure (a magnetic device), a random access memory (RAM), a read-only memory (ROM), an erasable programmable read-only memory (EPROM or flash memory), a fiber apparatus, and a portable optical disc read-only memory (CDROM). In addition, the computer readable medium may even print papers of the program or other media thereon because the program can be obtained in an electronic manner by, for example, performing optical scanning on papers or other media and then performing edition and interpretation or processing in another proper manner if necessary and then is stored in a computer memory.

It should be understood that parts of the present disclosure can be implemented by hardware, software, firmware, or a combination thereof. In the foregoing implementation manner, multiple steps or methods may be implemented by software or firmware that is stored in a memory and that is executed by a proper instruction system. For example, if hardware is used for implementation, same as in another implementation manner, implementation may be performed by any one of the following technologies well known in the art or a combination thereof: a discrete logic circuit including a logic gate circuit for implementing a logic function of a data signal, a dedicated integrated circuit including a proper combined logic gate circuit, a programmable gate array (PGA), a field programmable gate array (FPGA), and the like.

A person skilled in the art may understand that implementation of all or some of steps carried in the foregoing embodiment method is completed by instructing relevant hardware by a program. The program may be stored in a computer readable storage medium. When being executed, the program includes one or a combination of steps of the method embodiment.

In addition, functional units in the embodiments of the present invention may be integrated in a processing module or may separately physical exist in units, or two or more units are integrated in one module. The foregoing integrated module can be implemented in a form of hardware or can be implemented in a form of a software functional module. If the foregoing integrated module is implemented in a form of a software functional module and is sold or used as an independent product, the module can also be stored in a computer readable storage medium.

The storage medium mentioned above may be a read-only memory, a magnetic disk, or an optical disc. Although the embodiments of the present invention are shown and described in the above, it can be understood that the foregoing embodiments are exemplary and cannot be understood as limitation to the present disclosure. A person skilled in the art can change, modify, replace, and deform the foregoing embodiments within the scope of the present disclosure.

What is claimed is:

1. A data transmission method, comprising:
receiving a picture pushing message sent by an instant messaging service device, the picture pushing message comprising a target picture and a source user identification, wherein the picture pushing message is sent when the instant messaging service device receives a picture sending request from an instant messaging client to a specified public account, the picture sending request comprising the target picture and the source user identification;

based on the source user identification, querying a target electronic photo frame identification having a binding relationship with the source user identification; and based on the target electronic photo frame identification, sending the target picture to an electronic photo frame corresponding to the target electronic photo frame identification.

2. The method according to claim 1, before receiving the picture pushing message sent by the instant messaging service device, further comprising:

receiving a subscription notification message pushed by the instant messaging service device, wherein the subscription notification message comprises the source user identification and the target electronic photo frame identification;

establishing the binding relationship between the source user identification and the target electronic photo frame identification; and storing the binding relationship between the source user identification and the target electronic photo frame identification.

3. The method according to claim 2, wherein after storing the binding relationship between the source user identification and the target electronic photo frame identification, further comprising:

receiving a binding relationship removal request sent by the electronic photo frame, wherein the binding relationship removal request comprises the target electronic photo frame identification and the source user identification; and deleting the binding relationship between the target electronic photo frame identification and the source user identification according to the binding relationship removal request.

4. The method according to claim 1, wherein the picture pushing message further comprises a picture identification of the target picture; and after receiving the picture pushing message sent by the instant messaging service device, the method further comprises:

establishing a binding relationship between the picture identification of the target picture and the source user identification; and storing the binding relationship between the picture identification of the target picture and the source user identification; and after sending the target picture to the corresponding electronic photo frame, the method further comprises:

receiving feedback information of the target picture sent by the electronic photo frame, wherein the feedback information comprises the picture identification of the target picture; and sending a message comprising the source user identification and the feedback information to the instant messaging service device based on the picture identification of the target picture and the binding relationship between the picture identification of the target picture and the source user identification, wherein the instant messaging service device sends, according to the source user identification, the feedback information to the instant messaging client associated with the source user identification.

5. The method according to claim 1, after receiving the picture pushing message from the instant messaging service device, further comprising:

sending a notification delivery message to the instant messaging service device, wherein the notification delivery message comprises a picture identification of the target picture and the source user identification, wherein the instant messaging service device sends the notification delivery message to the instant messaging client associated with the source user identification;

receiving description information of the target picture from the instant messaging client associated with the source user identification, wherein the description information comprises the picture identification of the target picture and the source user identification;

querying the target electronic photo frame identification having the binding relationship with the source user identification based on the source user identification; and sending the description information to the electronic photo frame corresponding to the target electronic photo frame identification based on the target electronic photo frame identification, wherein the electronic photo frame corresponding to the target electronic photo frame identification stores the description information, and displays the target picture and the description information in a specified area when a checking request for the target picture is received.

6. A data transmission method, comprising:

receiving, by an instant messaging service device, a picture sending request sent by an instant messaging client to a specified public account, the picture sending request comprising a target picture and a source user identification;

sending, by the instant messaging service device, a picture pushing message to a photo frame background service device, the picture pushing message comprising the target picture and the source user identification;

querying, by the photo frame background service device, a target electronic photo frame identification having a binding relationship with the source user identification by using the source user identification as a basis; and sending, by the photo frame background service device, the target picture to an electronic photo frame corresponding to the target electronic photo frame identification by using the target electronic photo frame identification as a basis.

7. The method according to claim 6, before the receiving, by an instant messaging service device, a picture sending request sent by an instant messaging client to a specified public account, further comprising:

receiving, by the instant messaging service device, a subscription request for the specified public account that is sent by the instant messaging client, wherein the subscription request comprises the source user identification and the target electronic photo frame identification;

sending, by the instant messaging service device, a subscription notification message to the photo frame background service device, wherein the subscription notification message comprises the user identification and the electronic photo frame identification;

establishing, by the photo frame background service device, the binding relationship between the source user identification and the target electronic photo frame identification; and storing, by the photo frame background service device, the binding relationship between the source user identification and the target electronic photo frame identification.

8. The method according to claim 7, after the storing, by the photo frame background service device, the binding relationship between the source user identification and the target electronic photo frame identification, further comprising:
- receiving, by the photo frame background service device, a binding relationship removal request sent by the electronic photo frame, wherein the binding relationship removal request comprises the target electronic photo frame identification and the source user identification; and
- deleting, by the photo frame background service device, the binding relationship between the target electronic photo frame identification and the source user identification according to the binding relationship removal request.

9. The method according to claim 6, wherein the picture pushing message further comprises a picture identification of the target picture;
- after the sending, by the instant messaging service device, the picture pushing message to the photo frame background service device, the method further comprises:
  - establishing, by the photo frame background service device, a binding relationship between the picture identification of the target picture and the source user identification; and
  - storing, by the photo frame background service device, the binding relationship between the picture identification of the target picture and the source user identification; and
- after the sending, by the photo frame background service device, the target picture to the corresponding electronic photo frame, the method further comprises:
  - receiving, by the photo frame background service device, feedback information of the target picture sent by the electronic photo frame, wherein the feedback information comprises the picture identification of the target picture;
  - sending, by the photo frame background service device, a message comprising the source user identification and the feedback information to the instant messaging service device by using the picture identification of the target picture and the binding relationship between the picture identification of the target picture and the source user identification as a basis; and
  - sending, by the instant messaging service device according to the source user identification, the feedback information to the instant messaging client associated with the source user identification.

10. The method according to claim 6, after the sending, by the instant messaging service device, the picture pushing message to the photo frame background service device, further comprising:
- sending, by the photo frame background service device, a notification delivery message to the instant messaging service device, wherein the notification delivery message comprises a picture identification of the target picture and the source user identification;
- sending, by the instant messaging service device, the notification delivery message to the instant messaging client associated with the source user identification;
- receiving, by the photo frame background service device, description information of the target picture sent by the instant messaging client associated with the source user identification, wherein the description information comprises the picture identification of the target picture and the source user identification;
- querying, by the photo frame background service device, the target electronic photo frame identification having the binding relationship with the source user identification by using the source user identification as a basis; and
- sending, by the photo frame background service device, the description information to the electronic photo frame corresponding to the target electronic photo frame identification by using the target electronic photo frame identification as a basis, wherein the electronic photo frame corresponding to the target electronic photo frame identification stores the description information, and displays the target picture and the description information in a specified area when a checking request for the target picture is received.

11. A data transmission device, comprising:
a processor; and
one or more modules stored on a memory and executable by the processor, the one or more modules comprises:
- a receiving module, configured to receive a picture pushing message sent by an instant messaging service device, the picture pushing message comprising a target picture and a source user identification, and the picture pushing message being sent when the instant messaging service device receives a picture sending request from an instant messaging client to a specified public account, the picture sending request comprising the target picture and the source user identification;
- a querying module, configured to query a target electronic photo frame identification having a binding relationship with the source user identification by using the source user identification as a basis; and
- a sending module, configured to send the target picture to an electronic photo frame corresponding to the target electronic photo frame identification by using the target electronic photo frame identification as a basis.

12. The device according to claim 11, wherein:
the receiving module is further configured to receive a subscription notification message pushed by the instant messaging service device, wherein the subscription notification message comprises the source user identification and the target electronic photo frame identification; and
the device further comprises:
- a first relationship maintenance module, configured to establish the binding relationship between the source user identification and the target electronic photo frame identification; and
- a first storage module, configured to store the binding relationship between the source user identification and the target electronic photo frame identification.

13. The device according to claim 12, wherein
the receiving module is further configured to receive a binding relationship removal request sent by the electronic photo frame, wherein the binding relationship removal request comprises the target electronic photo frame identification and the source user identification; and
the first relationship maintenance module is further configured to delete the binding relationship between the target electronic photo frame identification and the source user identification according to the binding relationship removal request.

14. The device according to claim 11, wherein the picture pushing message further comprises a picture identification of the target picture;

the device further comprises:

a second relationship maintenance module, configured to establish a binding relationship between the picture identification of the target picture and the source user identification; and a second storage module, configured to store the binding relationship between the picture identification of the target picture and the source user identification; and the receiving module is further configured to receive feedback information of the target picture that is sent by the electronic photo frame, wherein the feedback information comprises the picture identification of the target picture; and the sending module is further configured to send a message comprising the source user identification and the feedback information to the instant messaging service device by using the picture identification of the target picture and the binding relationship between the picture identification of the target picture and the source user identification as a basis, wherein the instant messaging service device sends, according to the source user identification, the feedback information to the instant messaging client associated with the source user identification.

15. The device according to claim 11, wherein
the sending module is further configured to send a notification delivery message to the instant messaging service device, wherein the notification delivery message comprises a picture identification of the target picture and the source user identification;

the receiving module is further configured to receive description information of the target picture sent by the instant messaging client associated with the source user identification, wherein the description information comprises the picture identification of the target picture and the source user identification;

the querying module is further configured to query the target electronic photo frame identification having the binding relationship with the source user identification by using the source user identification as a basis; and the sending module is further configured to send the description information to the electronic photo frame corresponding to the target electronic photo frame identification by using the target electronic photo frame identification as a basis, wherein the electronic photo frame corresponding to the target electronic photo frame identification stores the description information, and displays the target picture and the description information in a specified area when a checking request for the target picture is received.

16. A data transmission system, comprising:
an instant messaging service device, and a photo frame background service device, wherein:
the instant messaging service device is configured to:
receive a picture sending request sent by an instant messaging client to a specified public account, the picture sending request comprising a target picture and a source user identification; and
send a picture pushing message to the photo frame background service device, the picture pushing message comprising the target picture and the source user identification; and
the photo frame background service device is configured to:

query a target electronic photo frame identification having a binding relationship with the source user identification by using the source user identification as a basis; and send the target picture to an electronic photo frame corresponding to the target electronic photo frame identification by using the target electronic photo frame identification as a basis.

17. The data transmission system according to claim 16, wherein:
the instant messaging service device is further configured to: receive a subscription request for the specified public account sent by the instant messaging client, wherein the subscription request comprises the source user identification and the target electronic photo frame identification; and send a subscription notification message to the photo frame background service device, wherein the subscription notification message comprises the user identification and the electronic photo frame identification;

the photo frame background service device is further configured to: establish the binding relationship between the source user identification and the target electronic photo frame identification; and store the binding relationship between the source user identification and the target electronic photo frame identification.

18. The data transmission system according to claim 17, wherein:
the photo frame background service device is further configured to: receive a binding relationship removal request sent by the electronic photo frame, wherein the binding relationship removal request comprises the target electronic photo frame identification and the source user identification; and delete the binding relationship between the target electronic photo frame identification and the source user identification according to the binding relationship removal request.

19. The data transmission system according to claim 16, wherein the picture pushing message further comprises a picture identification of the target picture;
the photo frame background service device is further configured to:
establish a binding relationship between the picture identification of the target picture and the source user identification;
store the binding relationship between the picture identification of the target picture and the source user identification;
after sending the target picture to the corresponding electronic photo frame, receive feedback information of the target picture sent by the electronic photo frame, wherein the feedback information comprises the picture identification of the target picture; and
send a message comprising the source user identification and the feedback information to the instant messaging service device by using the picture identification of the target picture and the binding relationship between the picture identification of the target picture and the source user identification as a basis; and
the instant messaging service device is further configured to: according to the source user identification, send the feedback information to the instant messaging client associated with the source user identification.

20. The data transmission system according to claim 16, wherein:

the photo frame background service device is further configured to send a notification delivery message to the instant messaging service device, wherein the notification delivery message comprises a picture identification of the target picture and the source user identification;

the instant messaging service device is further configured to send the notification delivery message to the instant messaging client associated with the source user identification; and the photo frame background service device is further configured to:
- receive description information of the target picture sent by the instant messaging client associated with the source user identification, wherein the description information comprises the picture identification of the target picture and the source user identification;
- query the target electronic photo frame identification having the binding relationship with the source user identification by using the source user identification as a basis; and
- send the description information to the electronic photo frame corresponding to the target electronic photo frame identification by using the target electronic photo frame identification as a basis, wherein the electronic photo frame corresponding to the target electronic photo frame identification stores the description information, and displays the target picture and the description information in a specified area when a checking request for the target picture is received.

* * * * *